US011155318B2

(12) United States Patent
Chong

(10) Patent No.: US 11,155,318 B2
(45) Date of Patent: Oct. 26, 2021

(54) DEVICE FOR SELECTIVE ROTATION OF VEHICULAR HANDLEBAR

(71) Applicant: Henry Chong, Toronto (CA)

(72) Inventor: Henry Chong, Toronto (CA)

( * ) Notice: Subject to any disclaimer, the term of this patent is extended or adjusted under 35 U.S.C. 154(b) by 884 days.

(21) Appl. No.: 15/709,622

(22) Filed: Sep. 20, 2017

(65) Prior Publication Data

US 2019/0009856 A1     Jan. 10, 2019

Related U.S. Application Data

(60) Provisional application No. 62/530,546, filed on Jul. 10, 2017.

(51) Int. Cl.
| | |
|---|---|
| *B62K 21/12* | (2006.01) |
| *B62K 21/18* | (2006.01) |
| *B62K 21/24* | (2006.01) |
| *B62K 21/16* | (2006.01) |

(52) U.S. Cl.
CPC .............. *B62K 21/24* (2013.01); *B62K 21/12* (2013.01); *B62K 21/16* (2013.01)

(58) Field of Classification Search
CPC ........ B62K 21/12; B62K 21/16; B62K 21/18; B62K 21/22; B62K 21/24; F16M 13/02
See application file for complete search history.

(56) References Cited

U.S. PATENT DOCUMENTS

| | | | |
|---|---|---|---|
| 1,413,463 A | 4/1922 | Filor | |
| 4,448,435 A * | 5/1984 | Hon ................ | B62K 15/006 280/278 |
| 5,085,063 A * | 2/1992 | Van Dyke ............... | B62H 5/04 70/218 |
| 5,201,242 A * | 4/1993 | Chi ........................ | B62K 21/18 403/370 |

(Continued)

FOREIGN PATENT DOCUMENTS

| | | |
|---|---|---|
| CA | 2916268 | 2/2017 |
| CH | 176187 | 3/1935 |

(Continued)

OTHER PUBLICATIONS

Machine translation of DE 102015103741 A1 obtained on Feb. 26, 2021.*

(Continued)

*Primary Examiner* — Adam D Rogers

(57) ABSTRACT

Apparatus is for, or is included with, a vehicle having a vehicular handlebar, and also having first and second pipe portions. The first elongated portion is configured to receive and support a vehicular handlebar, and to be slidably received, at least in part, in the second elongated portion. An engagement device is configured to selectively engage the first and second pipe portions with each other. The engagement device, in use, prevents the first and second pipe portions from rotating relative to each other. The engagement device is also configured to selectively disengage the (Continued)

first and second pipe portions from each other. The engagement device, in use, permits the first and second pipe portions to rotate relative to each other. A clamp assembly is configured to selectively clamp the first elongated portion and the second elongated portion with each other.

19 Claims, 15 Drawing Sheets

(56) References Cited

U.S. PATENT DOCUMENTS

| | | | | |
|---|---|---|---|---|
| 5,323,664 | A * | 6/1994 | Fairfield | B62K 21/16 74/551.1 |
| 5,588,336 | A * | 12/1996 | Chou | B62K 21/18 280/279 |
| 6,318,741 | B1 * | 11/2001 | Chen | B62K 3/002 16/900 |
| 6,581,492 | B1 * | 6/2003 | Chen | B62K 3/002 16/900 |
| 6,698,781 | B1 * | 3/2004 | Blake | B62K 21/18 280/279 |
| 7,296,813 | B2 * | 11/2007 | Montague | B62K 15/00 280/276 |
| 8,550,484 | B1 | 10/2013 | Draper | |
| 2002/0088301 | A1 * | 7/2002 | Chen | B62K 15/00 74/551.1 |
| 2002/0121155 | A1 * | 9/2002 | Wu | B62K 21/22 74/551.7 |
| 2003/0001351 | A1 * | 1/2003 | Schauble | B62K 3/002 280/87.05 |
| 2004/0145141 | A1 * | 7/2004 | Dennis | B62K 21/18 280/87.05 |
| 2005/0206120 | A1 * | 9/2005 | Liao | B62K 21/16 280/281.1 |
| 2006/0038376 | A1 * | 2/2006 | Okajima | B62K 21/06 280/276 |
| 2006/0076752 | A1 | 4/2006 | Montague et al. | |
| 2006/0096408 | A1 * | 5/2006 | Liao | B62K 21/16 74/551.1 |
| 2006/0177260 | A1 * | 8/2006 | Liao | B62K 21/22 403/109.1 |
| 2012/0125145 | A1 * | 5/2012 | VanderVeen | B62K 21/16 74/551.8 |

FOREIGN PATENT DOCUMENTS

| | | | |
|---|---|---|---|
| CH | 179307 | 8/1935 | |
| CN | 103569287 | 5/2016 | |
| DE | 77509 | 1/1894 | |
| DE | 3633392 | 4/1988 | |
| DE | 9401071 U1 * | 4/1994 | ............ B62K 21/18 |
| DE | 9418011 U1 * | 3/1995 | ............ B62K 21/18 |
| DE | 19837972 | 2/2000 | |
| DE | 102011054696 | 10/2012 | |
| DE | 102015103741 A1 * | 9/2016 | ............ B62K 21/18 |
| DE | 202016101573 U1 * | 6/2017 | ............ B62K 21/12 |
| EP | 1526065 A1 * | 4/2005 | ............ B62K 21/18 |
| EP | 3572312 A1 * | 11/2019 | ............ B62K 21/22 |
| FR | 2540062 A1 * | 8/1984 | ............ B62K 19/36 |
| FR | 2820106 | 2/2002 | |
| FR | 2878496 | 6/2006 | |
| GB | 2429440 | 4/2009 | |
| GB | 2475286 | 5/2011 | |
| GB | 2487584 | 8/2012 | |
| JP | 5223451 | 2/1977 | |
| JP | 2279485 | 11/1990 | |
| JP | 8119172 | 5/1996 | |
| JP | 8198168 | 8/1996 | |
| JP | 1120759 | 1/1999 | |
| JP | 2000153794 | 6/2000 | |
| NL | 2005592 | 10/2010 | |
| WO | 0029279 | 5/2000 | |
| WO | 2004113155 | 12/2004 | |
| WO | 2007023314 | 3/2007 | |
| WO | 2007148202 | 12/2007 | |
| WO | 2010106328 | 9/2010 | |
| WO | 2017106967 | 6/2017 | |

OTHER PUBLICATIONS

"FilpCrown is a tiny useful accessory that makes any bike fold flat for storage" Feb. 2015. Retrieved from https://www.treehugger.com/bikes/flipcrown-folds-bikes-flat-for-storage.html on Aug. 14, 2017.
Flipphandle Stem Turns Handlebars 90-degrees for Easy Storage, Jul. 22, 2011. Retrieved from https://www.wired.com/2011/07/flipphandle-stem-turns-handlebars-90-degrees-for-easy-storage/ on Aug. 14, 2017.
Kickstarter Project 843290275 Zenstem Rotating Bicycle Stem, Jul. 2016. Retrieved from https://www.kickstarter.com/projects/843290275/zenstem on Aug. 14, 2017.
Speedlifter Twist Pro SDS—YouTube Video, Aug. 21, 2015. Retrieved from https://www.youtube.com/watch?v=6JcshEWqqgs on Aug. 14, 2017.
Stokbikes, a space-saving innovation in cycling, Jun. 2016. Retrieved from https://www.kickstarter.com/projects/1612721476/stokbikes-a-space-saving-innovation-in-cycling?token=45049851 on Aug. 14, 2017.
VeloVision Review; Onza Minibike, Dec. 8, 2011. Retrieved from http://www.velovision.com/ftp-admin/VVArchive/www.velovisionmag.co.uk/showStory738f.html?storynum=1210 on Aug. 14, 2017.

* cited by examiner

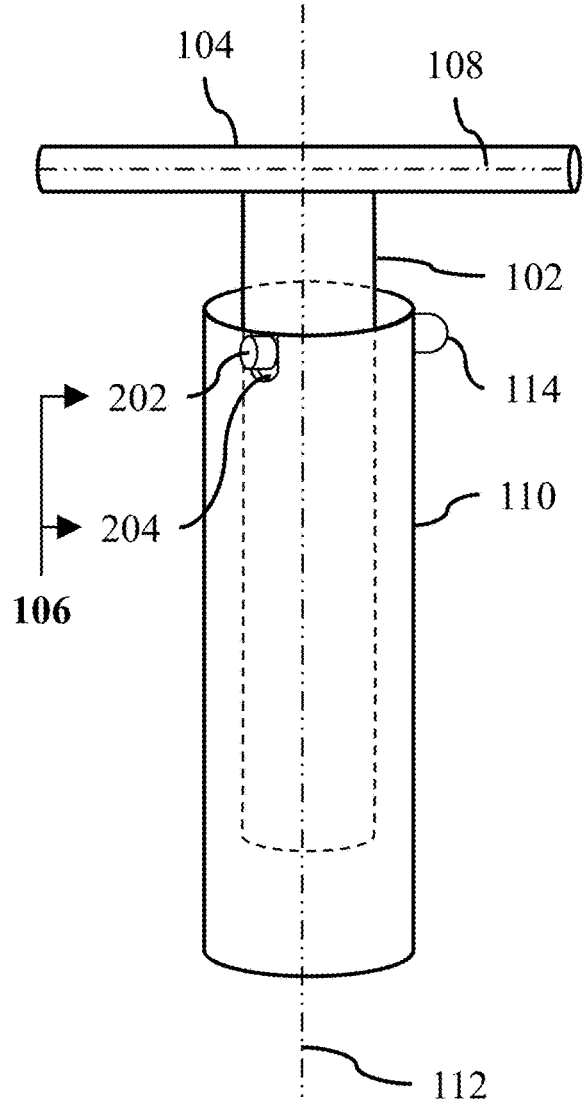
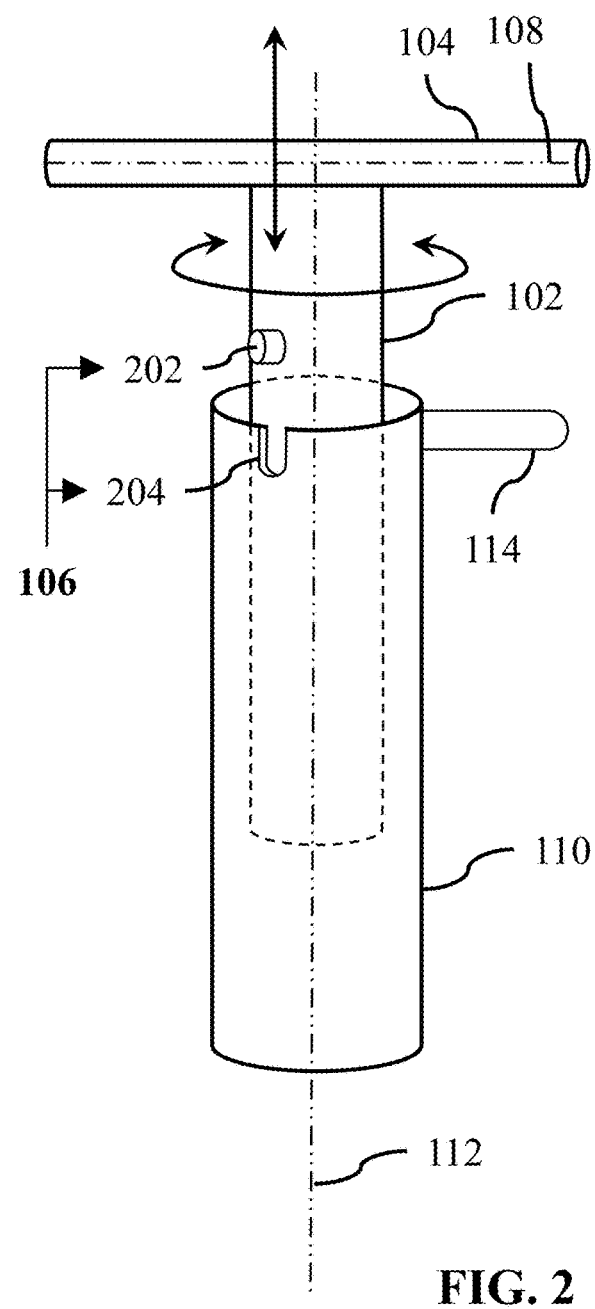
FIG. 1
FIG. 2

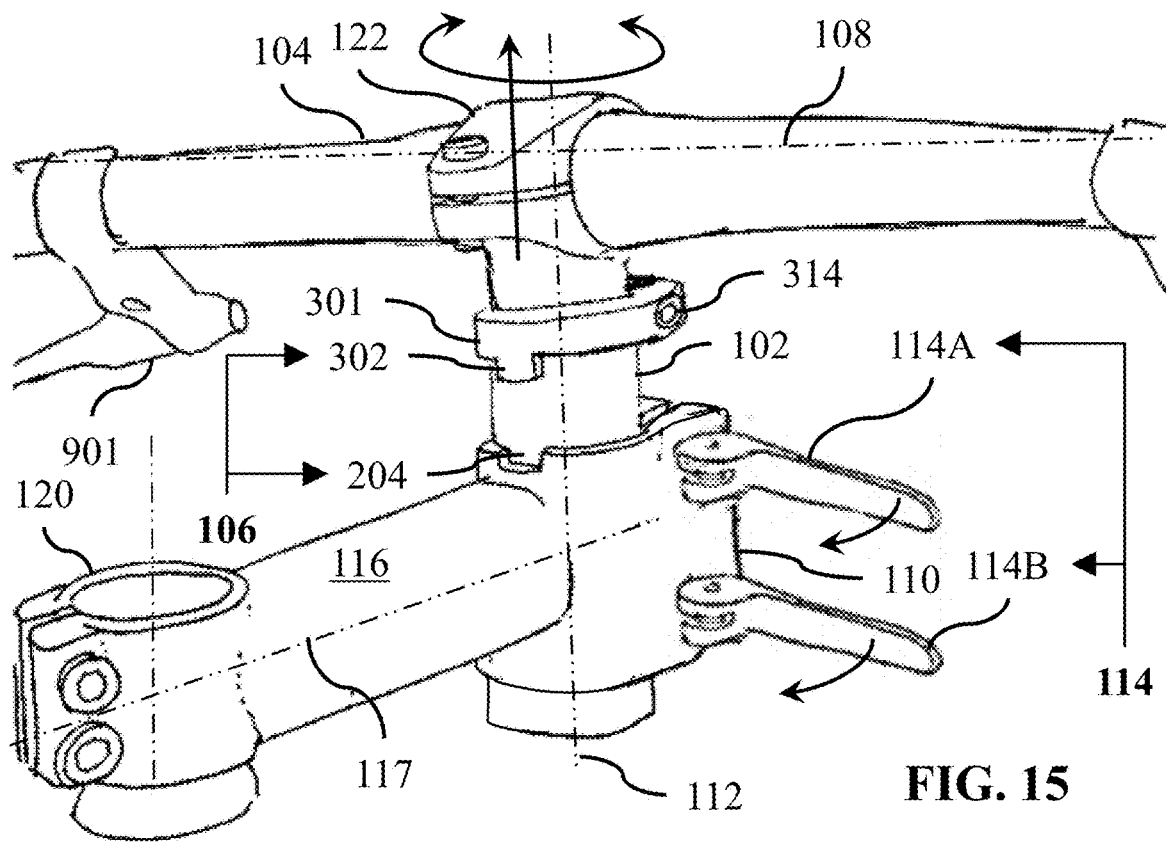
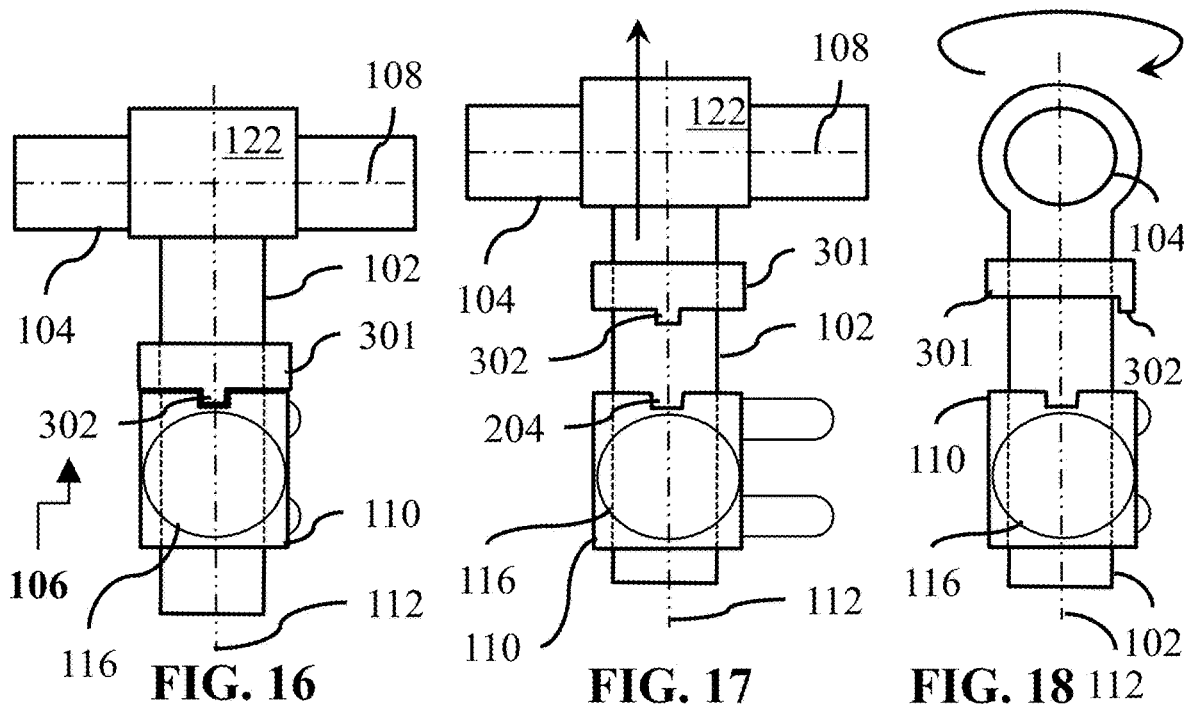

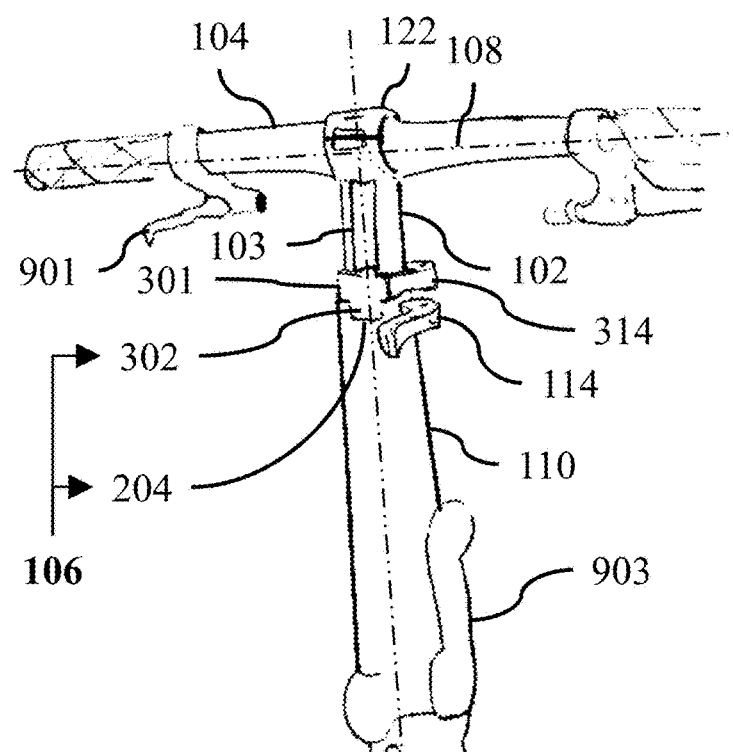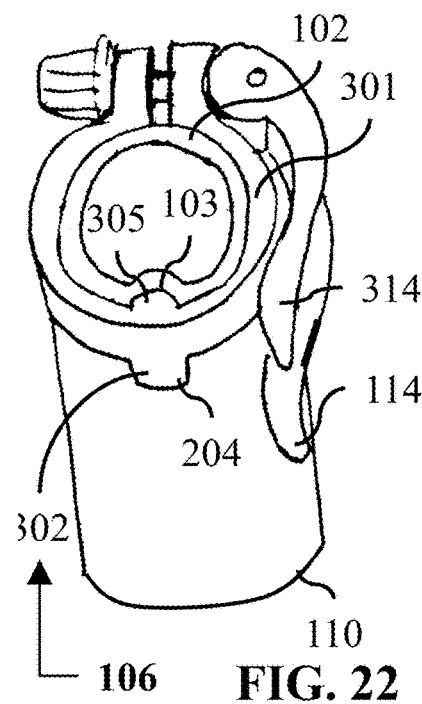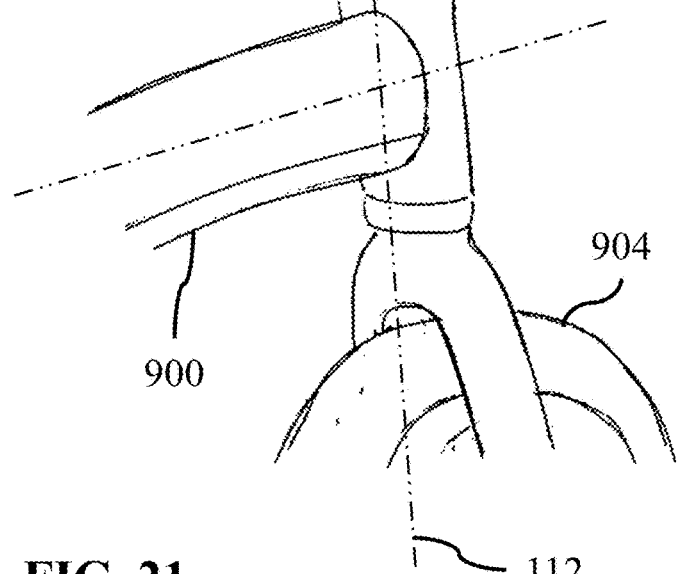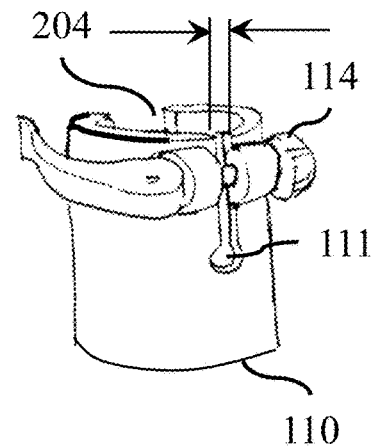
FIG. 21
FIG. 22
FIG. 23

DEVICE FOR SELECTIVE ROTATION OF VEHICULAR HANDLEBAR

TECHNICAL FIELD

This document relates to the technical field of (and is not limited to) vehicles, such as a bicycle, etc., and more specifically to an engagement device for selective rotation of a vehicular handlebar.

BACKGROUND

An example of a vehicle includes a bicycle (also called a personal transport vehicle, a cycle, bike, etc.). The bicycle is a human-powered, pedal-driven, single-track vehicle, having two wheels attached to a frame (typically constructed of pipe sections), one wheel behind the other. The vehicle includes a vehicular handlebar configured to facilitate controlled turning (movement) of the vehicle.

SUMMARY

It will be appreciated that there exists a need to mitigate (at least in part) at least one problem associated with existing bicycles (also called the existing technology). After much study of the known systems and methods with experimentation, an understanding (at least in part) of the problem and its solution has been identified (at least in part) and is articulated (at least in part) as follows:

As world populations increase, there may be an increasing need for portable personal transportation devices (such as a bicycle, etc.) configured to provide transportation for people in an efficient manner in cities. Bicycles and other personal vehicles are efficient at moving people and goods, but these vehicles may be difficult to store or walk with in dense urban spaces or narrow spaces (such as, hallways or train platforms) because of the wide berth needed to avoid or prevent (at least in part) the handlebars coming into contact with the surroundings.

A solution may be to decrease the overall cubic volume of the vehicle, or bicycle, which may be of great benefit in terms of reducing the required storage space (for the vehicle), resulting in lowered real estate costs, and/or improving the ease of handling of the vehicle.

The wide profile of handlebars makes bicycles difficult to be securely locked and/or stored beside each other, and/or for the riders (users) to enter into and exit parking lots without hitting the handlebar against other vehicles.

What may be needed is an apparatus configured to provide bicycles, and other vehicles with similar fork and steering assemblies, greater compactness by permitting the handlebar to be selectively rotatable and/or selectively vertically repositionable.

To mitigate, at least in part, at least one problem associated with the existing technology, there is provided (in accordance with a major aspect) an apparatus. The apparatus includes and is not limited to (comprises) an engagement device. The engagement device is for utilization with (may be retrofitted to, etc.) a vehicle. The vehicle has a first elongated portion and a second elongated portion. The first elongated portion is configured to receive and support a vehicular handlebar having a handlebar axis extending therethrough. The first elongated portion is also configured to be slidably received, at least in part, in the second elongated portion. The second elongated portion is configured to receive and support the first elongated portion. The first elongated portion and the second elongated portion are configured to be coaxially aligned along a common axis. The engagement device is configured to selectively engage a first elongated portion and a second elongated portion, of a vehicle, with each other. This is done in such a way that the engagement device, in use, prevents the first elongated portion and the second elongated portion from rotating relative to each other along the common axis once the engagement device, in use, selectively engages the first elongated portion and the second elongated portion with (relative to) each other. The engagement device is also configured to selectively disengage the first elongated portion and the second elongated portion from (relative to) each other. This is done in such a way that the engagement device, in use, permits the first elongated portion and the second elongated portion to rotate relative to each other along the common axis once the engagement device, in use, selectively disengages the first elongated portion and the second elongated portion from (relative to) each other. A clamp assembly is configured to selectively clamp the first elongated portion and the second elongated portion with (relative to) each other once the engagement device, in use, selectively engages the first elongated portion and the second elongated portion with each other.

To mitigate, at least in part, at least one problem associated with the existing technology, there is provided (in accordance with a major aspect) an apparatus. The apparatus includes and is not limited to (comprises) a vehicle. The vehicle has a first elongated portion and a second elongated portion. The first elongated portion is configured to receive and support a vehicular handlebar having a handlebar axis extending therethrough. The first elongated portion is also configured to be slidably received, at least in part, in the second elongated portion. The second elongated portion is configured to receive and support the first elongated portion. The first elongated portion and the second elongated portion are configured to be coaxially aligned along a common axis. An engagement device is configured to selectively engage the first elongated portion and the second elongated portion, of the vehicle, with each other. This is done in such a way that the engagement device, in use, prevents the first elongated portion and the second elongated portion from rotating relative to each other along the common axis once the engagement device, in use, selectively engages the first elongated portion and the second elongated portion with (relative to) each other. The engagement device is also configured to selectively disengage the first elongated portion and the second elongated portion from (relative to) each other in such a way that the engagement device, in use, permits the first elongated portion and the second elongated portion to rotate relative to each other along the common axis once the engagement device, in use, selectively disengages the first elongated portion and the second elongated portion from (relative to) each other. A clamp assembly is configured to selectively clamp the first elongated portion and the second elongated portion with (relative to) each other once the engagement device, in use, selectively engages the first elongated portion and the second elongated portion with each other.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

To mitigate, at least in part, at least one problem associated with the existing technology, there is provided (in accordance with a major aspect) an apparatus. The apparatus includes and is not limited to (comprises) an engagement device configured to selectively engage a first elongated portion and a second elongated portion, with each other (this is done in such a way that the engagement device, in use, prevents the first elongated portion and the second elongated portion from rotating relative to each other along the common axis once the engagement device, in use, selectively engages the first elongated portion and the second elongated portion with (relative to) each other). The first elongated portion is configured to receive and support a vehicular handlebar, of a vehicle. The vehicular handlebar has a handlebar axis extending therethrough. The second elongated portion is configured to receive and support the first elongated portion. The first elongated portion and the second elongated portion are configured to be coaxially aligned along a common axis. The first elongated portion is configured to be slidably received, at least in part, in the second elongated portion. The engagement device is also configured to selectively disengage the first elongated portion and the second elongated portion from (relative to) each other (this is done in such a way that the engagement device, in use, permits the first elongated portion and the second elongated portion to rotate relative to each other along the common axis once the engagement device, in use, selectively disengages the first elongated portion and the second elongated portion from (relative to) each other). A clamp assembly is configured to selectively clamp the first elongated portion and the second elongated portion with (relative to) each other once the engagement device, in use, selectively engages the first elongated portion and the second elongated portion with each other.

To mitigate, at least in part, at least one problem associated with the existing technology, there is provided (in accordance with a major aspect) an apparatus. The apparatus includes and is not limited to (comprises) a vehicle having a vehicular handlebar, and also having a first elongated portion and a second elongated portion. The first elongated portion is configured to receive and support the vehicular handlebar having a handlebar axis extending therethrough. The first elongated portion is also configured to be slidably received, at least in part, in the second elongated portion. The second elongated portion is configured to receive and support the first elongated portion. The first elongated portion and the second elongated portion are configured to be coaxially aligned along a common axis. An engagement device is configured to selectively engage the first elongated portion and the second elongated portion, of the vehicle, with each other (this is done in such a way that the engagement device, in use, prevents the first elongated portion and the second elongated portion from rotating relative to each other along the common axis once the engagement device, in use, selectively engages the first elongated portion and the second elongated portion with (relative to) each other). The engagement device is also configured to selectively disengage the first elongated portion and the second elongated portion from (relative to) each other (this is done in such a way that the engagement device, in use, permits the first elongated portion and the second elongated portion to rotate relative to each other along the common axis once the engagement device, in use, selectively disengages the first elongated portion and the second elongated portion from (relative to) each other). A clamp assembly is configured to selectively clamp the first elongated portion and the second elongated portion with (relative to) each other once the engagement device, in use, selectively engages the first elongated portion and the second elongated portion with each other.

Other aspects are identified in the claims. Other aspects and features of the non-limiting embodiments may now become apparent to those skilled in the art upon review of the following detailed description of the non-limiting embodiments with the accompanying drawings. This Summary is provided to introduce concepts in simplified form that are further described below in the Detailed Description. This Summary is not intended to identify key features or essential features of the disclosed subject matter, and is not intended to describe each disclosed embodiment or every implementation of the disclosed subject matter. Many other novel advantages, features, and relationships will become apparent as this description proceeds. The figures and the description that follow more particularly exemplify illustrative embodiments.

BRIEF DESCRIPTION OF THE DRAWINGS

The non-limiting embodiments may be more fully appreciated by reference to the following detailed description of the non-limiting embodiments when taken in conjunction with the accompanying drawings, in which:

FIG. 1 and FIG. 2 depict, in accordance with a first major aspect, embodiments of an engagement device and a clamp assembly configured for utilization in a first elongated portion and a second elongated portion of a vehicle, in which FIG. 1-FIG. 2 depict perspective views; and FIG. 3-FIG. 5 depict, in accordance with a second major aspect, embodiments of an engagement device and a clamp assembly configured for utilization in a first elongated portion and a second elongated portion of a vehicle, in which FIG. 3-FIG. 5 depict perspective views; and FIG. 6A-FIG. 6F depict embodiments of the vehicle for utilization with the embodiments of the engagement device and the clamp assembly of any one of FIG. 1-FIG. 5, in which FIG. 6A-FIG. 6F depict side views; and FIG. 6G-FIG. 6H depict embodiments of the vehicle, in which FIG. 6G-FIG. 6H depict front views; and FIG. 7-FIG. 10 depict, in accordance with a third major aspect, embodiments of an engagement device and a clamp assembly configured for utilization in a first elongated portion and a second elongated portion of a vehicle, in which FIG. 7-FIG. 8 depict side views, and FIG. 9-FIG. 10 depict perspective views; and FIG. 11-FIG. 20 depict, in accordance with a fourth major aspect, embodiments of an engagement device and a clamp assembly configured for utilization in a first elongated portion and a second elongated portion of a vehicle, in which FIG. 11, FIG. 15, FIG. 19A, FIG. 19B and FIG. 20 depict perspective views, and FIG. 12-FIG. 14 and FIG. 16-FIG. 18 depict side views; and FIG. 21-FIG. 33 depict, in accordance with a fifth major aspect, embodiments of an engagement device and a clamp assembly configured for utilization in a first elongated portion and a second elongated portion of a vehicle, in which FIG. 21-FIG. 24, FIG. 28 and FIG. 31-FIG. 33 depict perspective views, and FIG. 25-FIG. 27 and FIG. 29-FIG. 30 depict side views.

Figure 3:
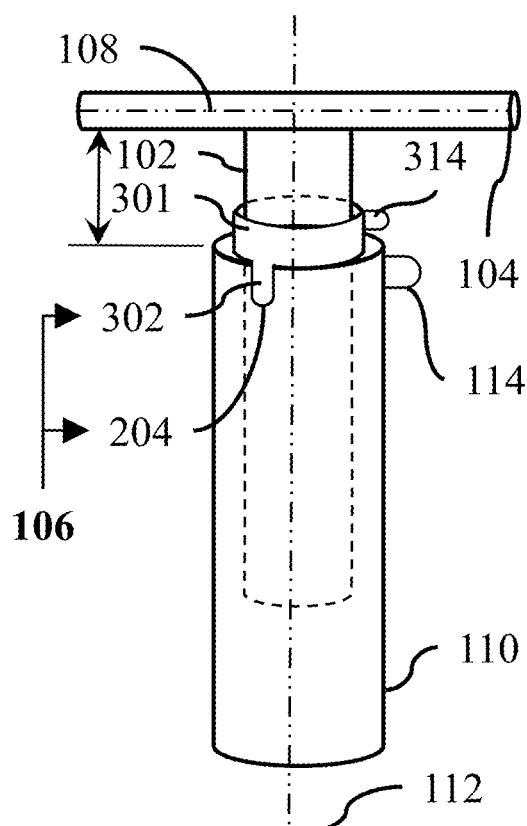

The drawings are not necessarily to scale and may be illustrated by phantom lines, diagrammatic representations and fragmentary views. In certain instances, details unnecessary for an understanding of the embodiments (and/or details that render other details difficult to perceive) may have been omitted. Corresponding reference characters indicate corresponding components throughout the several figures of the drawings. Elements in the several figures are illustrated for simplicity and clarity and have not been drawn to scale. The dimensions of some of the elements in the figures may be emphasized relative to other elements for facilitating an understanding of the various disclosed embodiments. In addition, common, but well-understood, elements that are useful or necessary in commercially feasible embodiments are often not depicted to provide a less obstructed view of the embodiments of the present disclosure.

LISTING OF REFERENCE NUMERALS USED IN THE DRAWINGS 102 first elongated portion
103 elongated channel
104 vehicular handlebar
106 engagement device
108 handlebar axis
110 second elongated portion
111 axially-extending expansion slot
112 common axis
114 clamp assembly
114A first clamp
114B second clamp
115 clamp expansion channel
116 stem
117 stem axis
119 cavity
120 fork clamp
121 fork axis
122 handlebar clamp
202 first mating part
204 second mating portion
301 collar assembly
302 first mating portion
305 collar-engagement device
314 collar clamp
900 vehicle
901 brake levers
903 folding handlebar hinge release lever
904 front wheel (rotatable wheel)

DETAILED DESCRIPTION OF THE NON-LIMITING EMBODIMENT(S)

The following detailed description is merely exemplary and is not intended to limit the described embodiments or the application and uses of the described embodiments. As used, the word "exemplary" or "illustrative" means "serving as an example, instance, or illustration." Any implementation described as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure. The scope of the claim is defined by the claims (in which the claims may be amended during patent examination after the filing of this application). For the description, the terms "upper," "lower," "left," "rear," "right," "front," "vertical," "horizontal," and derivatives thereof shall relate to the examples as oriented in the drawings. There is no intention to be bound by any expressed or implied theory in the preceding Technical Field, Background, Summary or the following detailed description. It is also to be understood that the devices and processes illustrated in the attached drawings, and described in the following specification, are exemplary embodiments (examples), aspects and/or concepts defined in the appended claims. Hence, dimensions and other physical characteristics relating to the embodiments disclosed are not to be considered as limiting, unless the claims expressly state otherwise. It is understood that the phrase "at least one" is equivalent to "a". The aspects (examples, alterations, modifications, options, variations, embodiments and any equivalent thereof) are described regarding the drawings. It should be understood that the invention is limited to the subject matter provided by the claims, and that the invention is not limited to the particular aspects depicted and described. It will be appreciated that the scope of the meaning of a device configured to be coupled to an item (that is, to be connected to, to interact with the item, etc.) is to be interpreted as the device being configured to be coupled to the item, either directly or indirectly. Therefore, "configured to" may include the meaning "either directly or indirectly" unless specifically stated otherwise.

FIG. 1 and FIG. 2 depict, in accordance with a first major aspect, embodiments of an engagement device 106 and a clamp assembly 114 configured for utilization in a first elongated portion 102 (also called a first pipe portion, a first shaft portion, etc., and any equivalent thereof) and a second elongated portion 110 (also called a second pipe portion, a second shaft portion, etc., and any equivalent thereof) of a vehicle 900. FIG. 6A-FIG. 6F depict embodiments of the vehicle 900. FIG. 1-FIG. 2 depict perspective views. The first elongated portion 102 is movable relative to the second elongated portion 110.

The embodiments as depicted in FIG. 1-FIG. 2 are also applicable to the embodiments as depicted in FIG. 7-FIG. 10.

Referring to the embodiment as depicted in FIG. 1-FIG. 2, there is provided an apparatus. The apparatus includes and is not limited to (comprises) a synergistic combination of an engagement device 106 and a clamp assembly 114. The engagement device 106 is configured to selectively engage a first elongated portion 102 and a second elongated portion 110, of a vehicle 900 (such as a bicycle, a personal vehicle, etc., and any equivalent thereof), with each other. This is done in such a way that the engagement device 106, in use, prevents the first elongated portion 102 and the second elongated portion 110 from rotating (relative to) each other along a common axis 112 once the engagement device 106, in use, selectively engages the first elongated portion 102 and the second elongated portion 110 rotating (relative to) each other. The vehicle 900 is configured to convey (move or transport) a person (at least one or more persons).

The first elongated portion 102 is configured to receive and support a vehicular handlebar 104 having a handlebar axis 108 extending therethrough. The second elongated portion 110 is configured to receive and a support the first elongated portion 102. The first elongated portion 102 and the second elongated portion 110 are configured to be coaxially aligned along a common axis 112. The first elongated portion 102 is configured to be slidably received, at least in part, in the second elongated portion 110. It will be appreciated that the first elongated portion 102 may include (or be called) a handlebar support post, etc., and any equivalent thereof.

The engagement device 106 is further configured to selectively disengage the first elongated portion 102 and the second elongated portion 110 rotating (relative to) to each other. This is done in such a way that the engagement device 106, in use, permits the first elongated portion 102 and the second elongated portion 110 to rotate (relative to) to each other along the common axis 112 once the engagement device 106, in use, selectively disengages the first elongated portion 102 and the second elongated portion 110 from (relative to) each other.

The clamp assembly 114 is configured to selectively clamp the first elongated portion 102 and the second elongated portion 110 with (relative to) each other once the engagement device 106, in use, selectively engages the first elongated portion 102 and the second elongated portion 110 with (relative to) each other.

Referring to the embodiment as depicted in FIG. 1, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically.

Referring to the embodiment as depicted in FIG. 2, the vehicular handlebar 104 is positioned in a non-riding position, in which the vehicular handlebar 104 is in the correct position or orientation for handlebar disablement of the vehicular handlebar 104 (this positioned may be called a storage position of the vehicular handlebar 104).

Referring to the embodiments as depicted in FIG. 1-FIG. 2, the apparatus as described above is adapted such that the engagement device 106 includes a first mating part 202 and a second mating portion 204 (such as, a mating notch, etc., and any equivalent thereof). The first mating part 202 extends from the first elongated portion 102. The second mating portion 204 is defined by the second elongated portion 110.

In accordance with a preferred embodiment, the engagement device 106 includes a first mating part 202 provided by the first elongated portion 102. A second mating portion 204 is provided by the second elongated portion 110. The first mating part 202 and the second mating portion 204 are configured to mate with each other.

Referring to the embodiments as depicted in FIG. 1-FIG. 2, the apparatus as described above is adapted such that the clamp assembly 114 is mounted to the second elongated portion 110.

Figure 9:
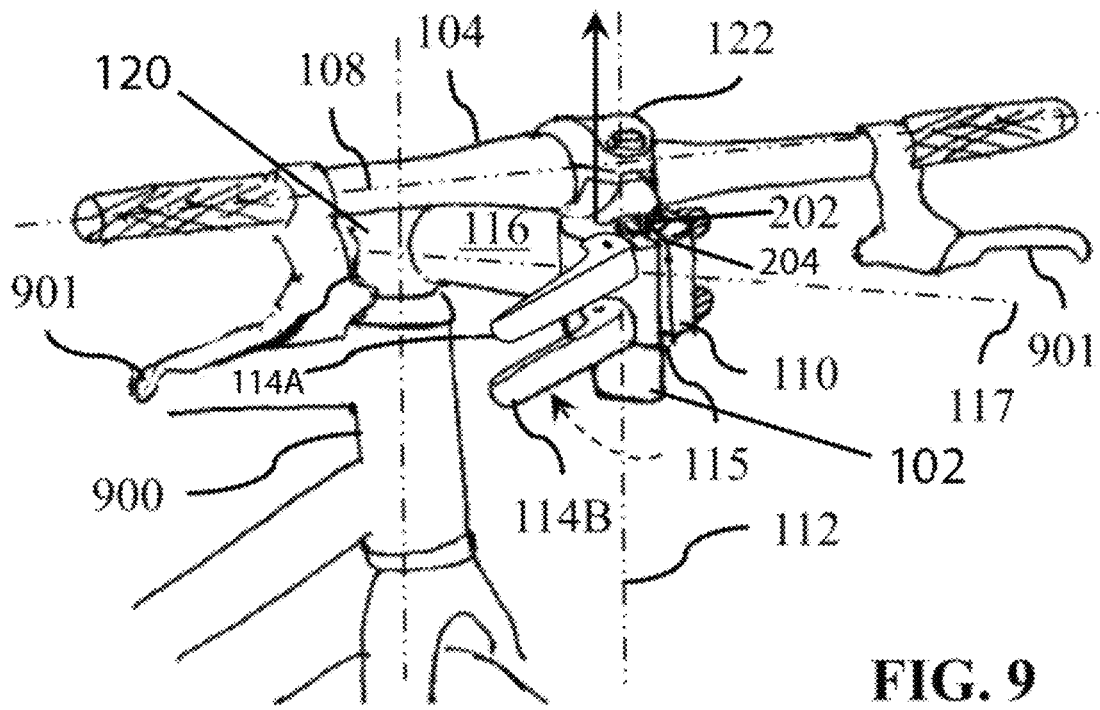

Referring to the embodiment as depicted in FIG. 1, the vehicular handlebar 104 is positioned in a handlebar-riding position (which is also depicted in FIG. 9, in which the vehicular handlebar 104 is in the correct position or orientation for the user to control the operation (orientation) of the vehicular handlebar 104 of the bicycle, or the vehicle 900, more specifically). In the handlebar-riding position, the engagement device 106, in use, engages (axially aligns) the first elongated portion 102 with the second elongated portion 110; this is done in such way that the handlebar axis 108 (which extends through the vehicular handlebar 104, and in which the vehicular handlebar 104 is affixed to the first elongated portion 102) and the common axis 112 (which extends through the second elongated portion 110) are positioned (oriented) in the handlebar-riding position, the clamp assembly 114 is activated in such a way that the clamp assembly 114, in use, clamps (locks or affixes) the first elongated portion 102 with the second elongated portion 110; this is done in such a way that the first elongated portion 102, the vehicular handlebar 104 and the second elongated portion 110 are rotatable in unison and are rotatable (along the common axis 112). In accordance with a preferred embodiment for FIG. 1, the engagement device 106 includes the combination of the first mating part 202 and the second mating portion 204. The first mating part 202 (such as a pin, etc.) extends from (is provided by) the first elongated portion 102. The second mating portion 204 (such as a notch, etc.) is defined by (is provided by) the second elongated portion 110.

Figure 10:
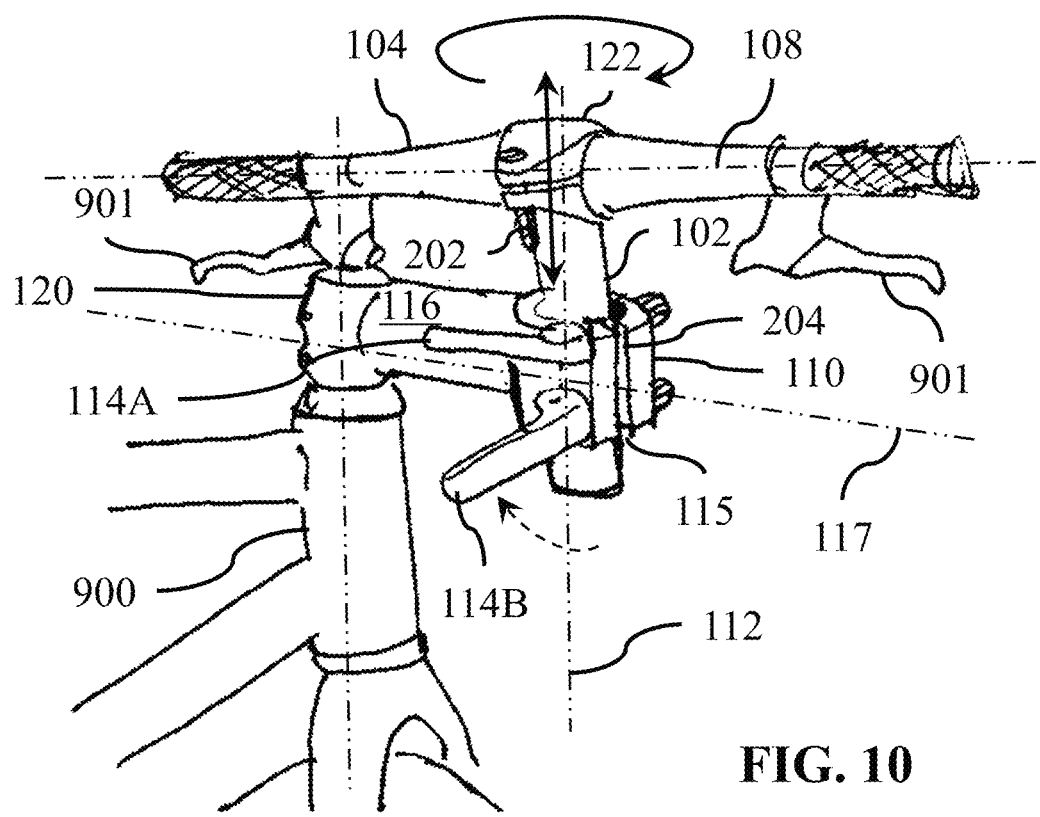
Figure 11:
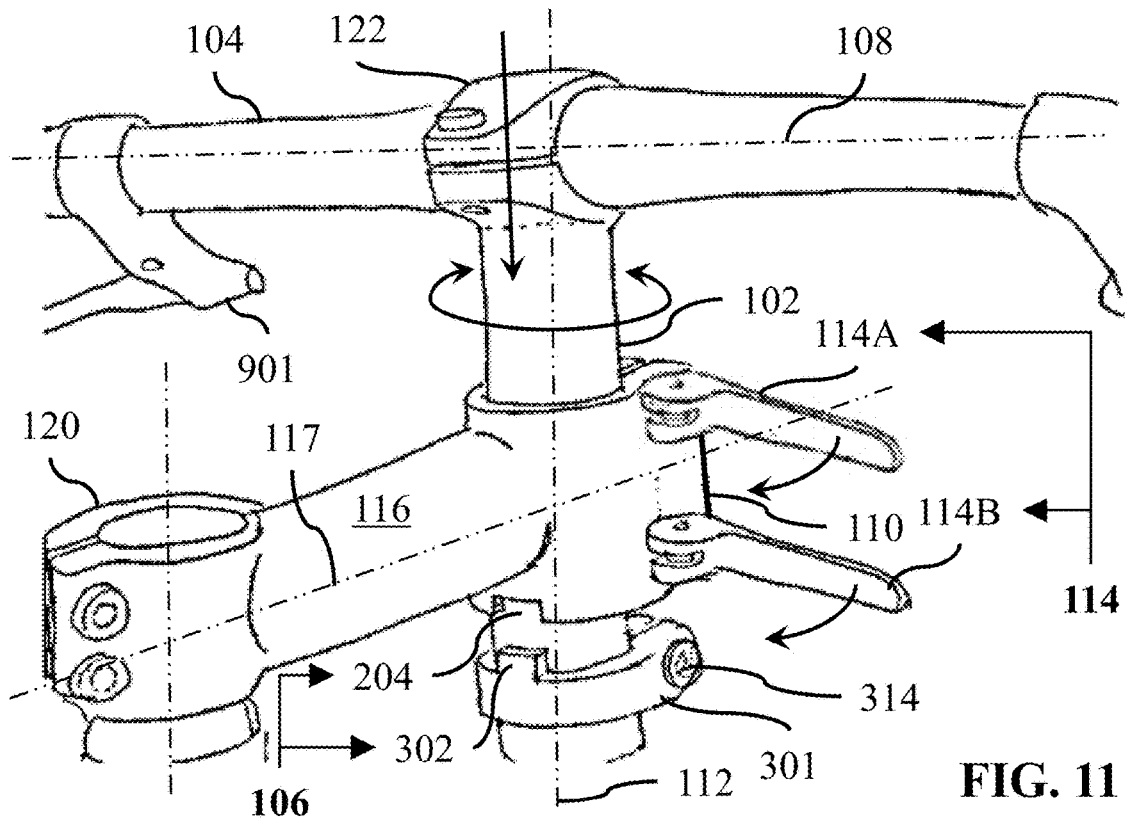

Referring to the embodiment as depicted in FIG. 2, the vehicular handlebar 104 is positioned in a non-riding position (which is also depicted in FIG. 10, in which the vehicular handlebar 104 is in the correct position or orientation for a handlebar disablement position (storage position) of the vehicular handlebar 104. In the handlebar disablement position, the engagement device 106, in use, disengages the first elongated portion 102 from the second elongated portion 110 (that is, the first elongated portion 102 and the second elongated portion 110 become axially de-aligned from (relative to) each other); this is done in such way that the handlebar axis 108 (which extends through the vehicular handlebar 104, and in which the vehicular handlebar 104 is affixed to the first elongated portion 102) and the common axis 112 (which extends through the second elongated portion 110) are positioned (oriented) in the handlebar disablement position. In the handlebar disablement position, the clamp assembly 114 is deactivated in such a way that the clamp assembly 114, in use, unclamps (unlocks or decouples) the first elongated portion 102 from the second elongated portion 110; this is done in such a way that the first elongated portion 102 and the vehicular handlebar 104 are rotatable independently from the second elongated portion 110 (along the common axis 112). In accordance with a preferred embodiment as depicted in FIG. 2, the engagement device 106 includes the combination of the first mating part 202 and the second mating portion 204. The first mating part 202 (such as a pin, etc.) extends from (is provided by) the first elongated portion 102. The second mating portion 204 (such as a notch, etc.) is defined by (is provided by) the second elongated portion 110.

Figure 4:
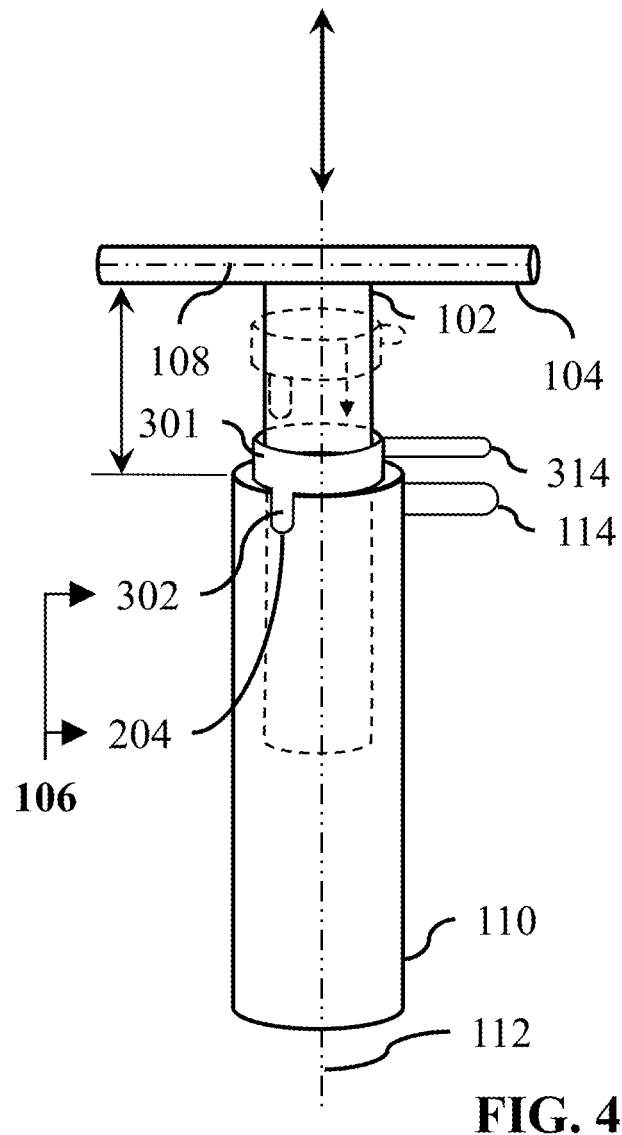
Figure 5:
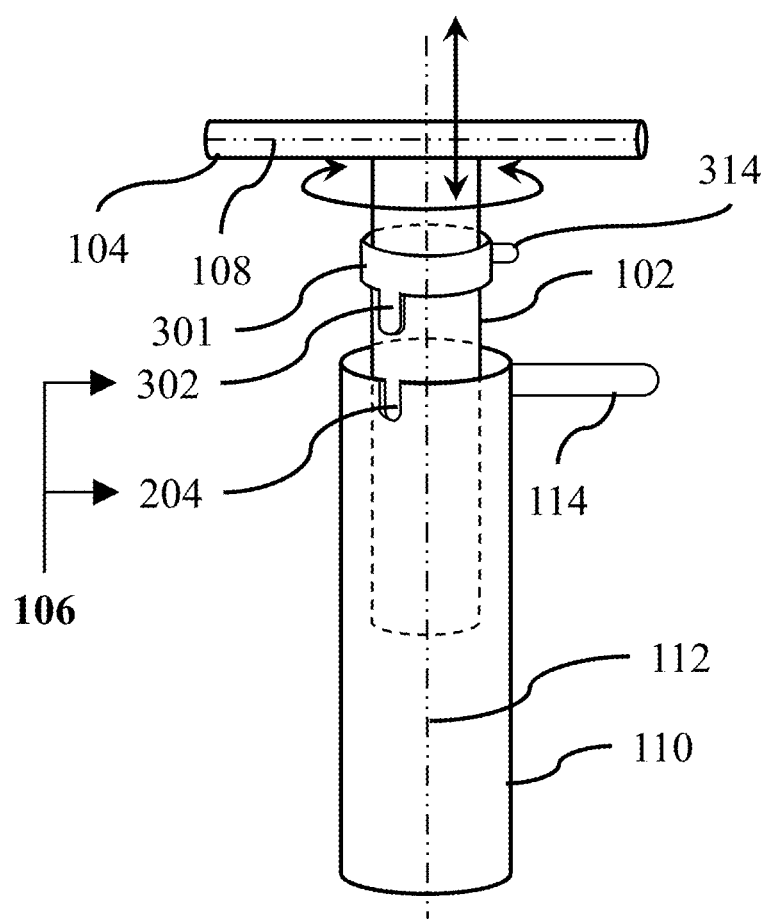

FIG. 3-FIG. 5 depict, in accordance with a second major aspect, embodiments of an engagement device 106 and a clamp assembly 114 configured for utilization in a first elongated portion 102 and a second elongated portion 110 of a vehicle 900. FIG. 6A-FIG. 6F depict embodiments of the vehicle 900. FIG. 3-FIG. 5 depict perspective views.

The embodiments as depicted in FIG. 3-FIG. 5 are also applicable to the embodiments as depicted in FIG. 11-FIG. 33.

Referring to the embodiments as depicted in FIG. 3-FIG. 5, the apparatus as described above is adapted such that the engagement device 106 includes a synergistic combination of a collar assembly 301, a first mating portion 302 (such as a collar extension portion, and any equivalent thereof) and a second mating portion 204 (such as a mating part, and any equivalent thereof). Preferably, the collar assembly 301 is configured to be movable. The first mating portion 302 and the second mating portion 204 are configured to mate (securely interface, securely mate, lock, etc.) with each other. The collar assembly 301 is configured to be slidable along the first elongated portion 102. The first mating portion 302 extends from the collar assembly 301. The second mating portion 204 is defined by the second elongated portion 110.

In accordance with a preferred embodiment, the engagement device 106 includes a collar assembly 301 configured to be slidable along the first elongated portion 102. A first mating portion 302 is provided by the collar assembly 301. A second mating portion 204 is provided by the second elongated portion 110. The first mating portion 302 and the second mating portion 204 are configured to mate with each other.

Referring to the embodiment as depicted in FIG. 3, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically.

Referring to the embodiment as depicted in FIG. 5, the vehicular handlebar 104 is positioned in a non-riding position, in which the vehicular handlebar 104 is in the correct position or orientation for handlebar disablement of the vehicular handlebar 104.

Referring to the embodiments as depicted in FIG. 3-FIG. 5, the apparatus as described above is adapted such that the apparatus further includes a collar clamp 314. The collar clamp 314 is mounted to the collar assembly 301. The collar clamp 314 is configured to selectively clamp the collar assembly 301 to the first elongated portion 102.

Referring to the embodiment as depicted in FIG. 3, there is provided the collar assembly 301 configured to be movable along a length of the outer surface of the first elongated portion 102. The collar assembly 301 is configured to receive (at least in part) the first elongated portion 102. The vehicular handlebar 104 is positioned in a handlebar-riding position (which is also depicted in FIG. 9, in which the vehicular handlebar 104 is in the correct position or orientation for the user to control the operation (orientation) of the vehicular handlebar 104 of the bicycle, or the vehicle 900, more specifically). In a handlebar-riding position, the collar clamp 314 of the collar assembly 301 is activated to clamp (lock) the collar assembly 301 to the first elongated portion 102 (the collar assembly 301 does not move (relative to) the first elongated portion 102). In the handlebar-riding position, the engagement device 106, in use, engages (axially aligns) the first elongated portion 102 with the second elongated portion 110 (specifically, the first mating portion 302 of the collar assembly 301, in use, engages the second mating portion 204 of the second elongated portion 110); this is done in such way that the handlebar axis 108 (which extends through the vehicular handlebar 104, and in which the vehicular handlebar 104 is affixed to the first elongated portion 102) and the common axis 112 (which extends through the second elongated portion 110) are positioned (oriented) in the handlebar-riding position. In the handlebar-riding position, the clamp assembly 114 is activated in such a way that the clamp assembly 114, in use, clamps (locks or affixes) the first elongated portion 102 with the second elongated portion 110; this is done in such a way that the first elongated portion 102, the vehicular handlebar 104 and the second elongated portion 110 are rotatable in unison and are rotatable (along the common axis 112). In accordance with a preferred embodiment for FIG. 3, the engagement device 106 includes the combination of the first mating portion 302 and the second mating portion 204. The first mating portion 302 (such as a pin, etc.) extends from (is provided by) the collar assembly 301. The second mating portion 204 (such as a notch, etc.) is defined by (is provided by) the second elongated portion 110.

Referring to the embodiment as depicted in FIG. 4, the collar assembly 301 includes a collar clamp 314. The collar clamp 314 is configured to disengage the collar assembly 301 from the first elongated portion 102 (this is done in such a way that the collar assembly 301 is freely movable along an axial length of the first elongated portion 102). The collar assembly 301 is configured to be repositioned, so that the vehicular handlebar 104 may be repositioned (vertical height adjusted).

Referring to the embodiment as depicted in FIG. 5, the vehicular handlebar 104 is positioned in a non-riding position (which is also depicted in FIG. 10, in which the vehicular handlebar 104 is in the correct position or orientation for a handlebar disablement position (storage position) of the vehicular handlebar 104. In the handlebar disablement position, the collar clamp 314 is deactivated (this is done in such a way that the collar assembly 301 is freely movable along a length of the first elongated portion 102). In the handlebar disablement position, the engagement device 106, in use, disengages the first elongated portion 102 from the second elongated portion 110 (that is, the first elongated portion 102 and the second elongated portion 110 become axially de-aligned from (relative to) each other); specifically, the first mating portion 302 of the collar assembly 301, in use, becomes disengaged from the second mating portion 204 of the second elongated portion 110; this is done in such way that the handlebar axis 108 (which extends through the vehicular handlebar 104, and in which the vehicular handlebar 104 is affixed to the first elongated portion 102) and the common axis 112 (which extends through the second elongated portion 110) are positioned (oriented) in the handlebar disablement position. In the handlebar disablement position, the clamp assembly 114 is deactivated in such a way that the clamp assembly 114, in use, unclamps (unlocks or decouples) the first elongated portion 102 from the second elongated portion 110; this is done in such a way that the first elongated portion 102 and the vehicular handlebar 104 are rotatable independently from the second elongated portion 110 (along the common axis 112). In accordance with a preferred embodiment for FIG. 3, the engagement device 106 includes the combination of the first mating portion 302 and the second mating portion 204. The first mating portion 302 (such as a pin, etc.) extends from (is provided by) the collar assembly 301. The second mating portion 204 (such as a notch, etc.) is defined by (is provided by) the second elongated portion 110.

FIG. 6A-FIG. 6F depict embodiments of the vehicle 900 for utilization with the embodiments of the engagement device 106 and the clamp assembly 114 of any one of FIG. 1-FIG. 5. It will be appreciated that the embodiments of the vehicle 900 may be utilized with the embodiments of the engagement device 106 and the clamp assembly 114 of any one of FIG. 1-FIG. 5, and FIG. 7-FIG. 33. FIG. 6A-FIG. 6F depict side views.

Figure 6A:
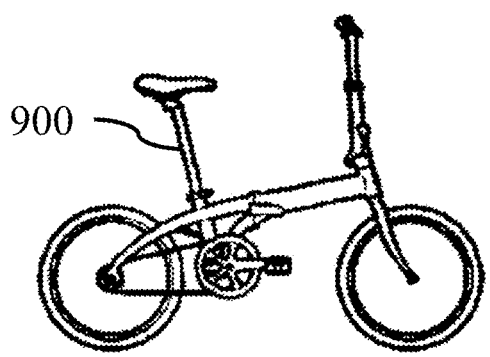

Referring to the embodiment as depicted in FIG. 6A, there is depicted a folding bicycle with the apparatus installed, in which the handlebar is positioned in the handlebar-riding position (this embodiment is applicable to or is associated with FIG. 21-FIG. 33).

Figure 6C:
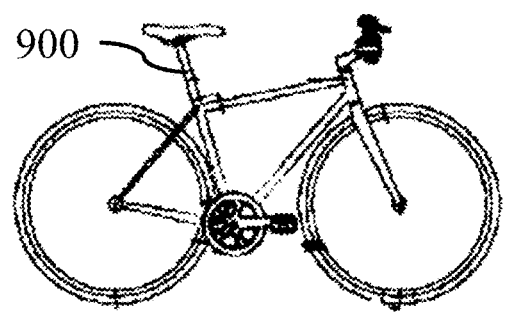
Figure 6B:
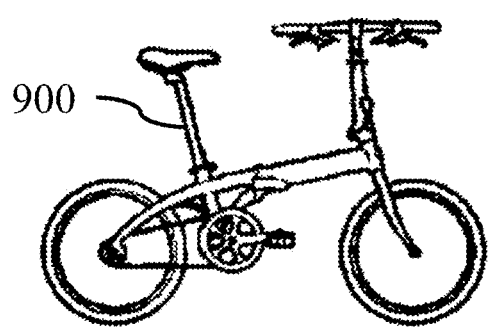

Referring to the embodiment as depicted in FIG. 6B, there is depicted a folding bicycle with the apparatus installed, in which the handlebar is positioned in the handlebar storage position (this embodiment is applicable to or is associated with FIG. 21-FIG. 33). It will be appreciated that the handlebar storage position is an example (or instance) of the non-riding position.

Referring to the embodiment as depicted in FIG. 6C, there is depicted a non-folding bicycle with the apparatus installed, in which the handlebar is positioned in the handlebar-riding position (this embodiment is applicable to or is associated with FIG. 21-FIG. 33).

Figure 6D:
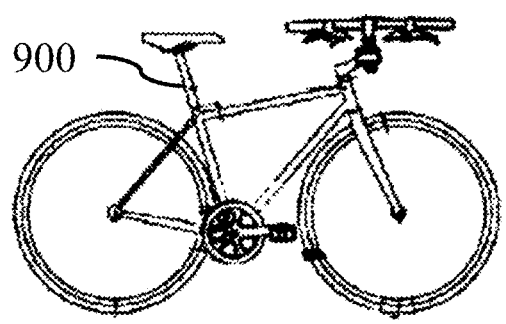

Referring to the embodiment as depicted in FIG. 6D, there is depicted a non-folding bicycle with the apparatus installed, in which the handlebar is positioned in the handlebar storage position (this embodiment is applicable to or is associated with FIG. 21-FIG. 33).

Figure 6E:
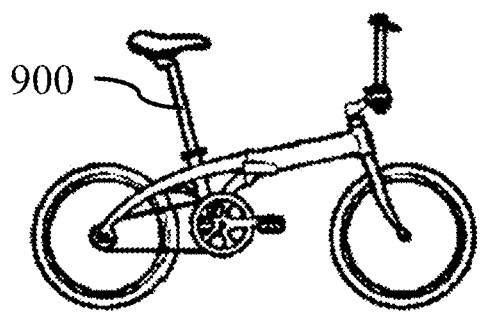

Referring to the embodiment as depicted in FIG. 6E, there is depicted a bicycle with a fork stem device having the apparatus installed thereto, in which the handlebar is positioned in the handlebar-riding position (this embodiment is applicable to or is associated with FIG. 7-FIG. 20).

Figure 6F:
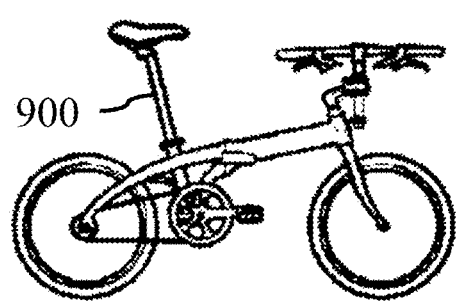

Referring to the embodiment as depicted in FIG. 6F, there is depicted a bicycle with a fork stem device having the apparatus installed thereto, in which the handlebar is positioned in the handlebar storage position (this embodiment is applicable to or is associated with the embodiments of FIG. 7-FIG. 20).

Figure 6G:
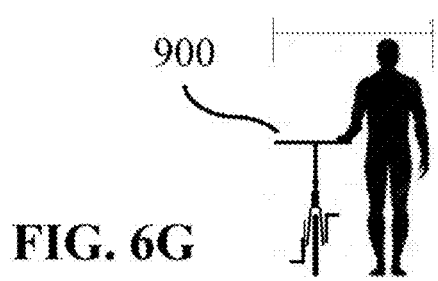
Figure 6H:
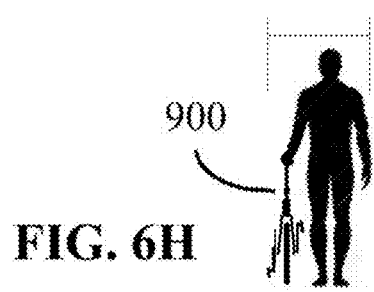

FIG. 6G-FIG. 6H depict embodiments of the vehicle 900 (FIG. 6G-FIG. 6H depict front views). In accordance with the embodiment of FIG. 6G, the vehicle 900 is in the riding position (the handlebars 104 are ready to be utilized for operating the vehicle 900). In accordance with the embodiment of FIG. 6G, the vehicle 900 is in the non-riding position (the handlebars 104 are not ready to be utilized for operating the vehicle 900).

Figure 7:
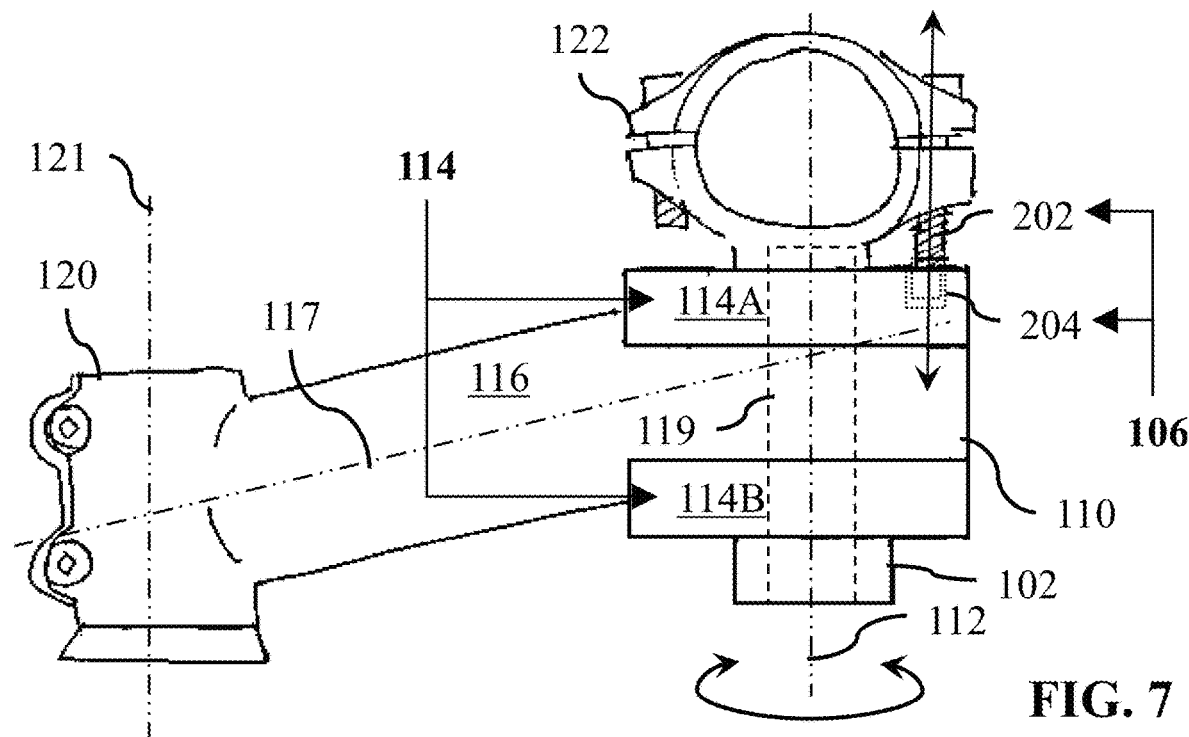
Figure 8:
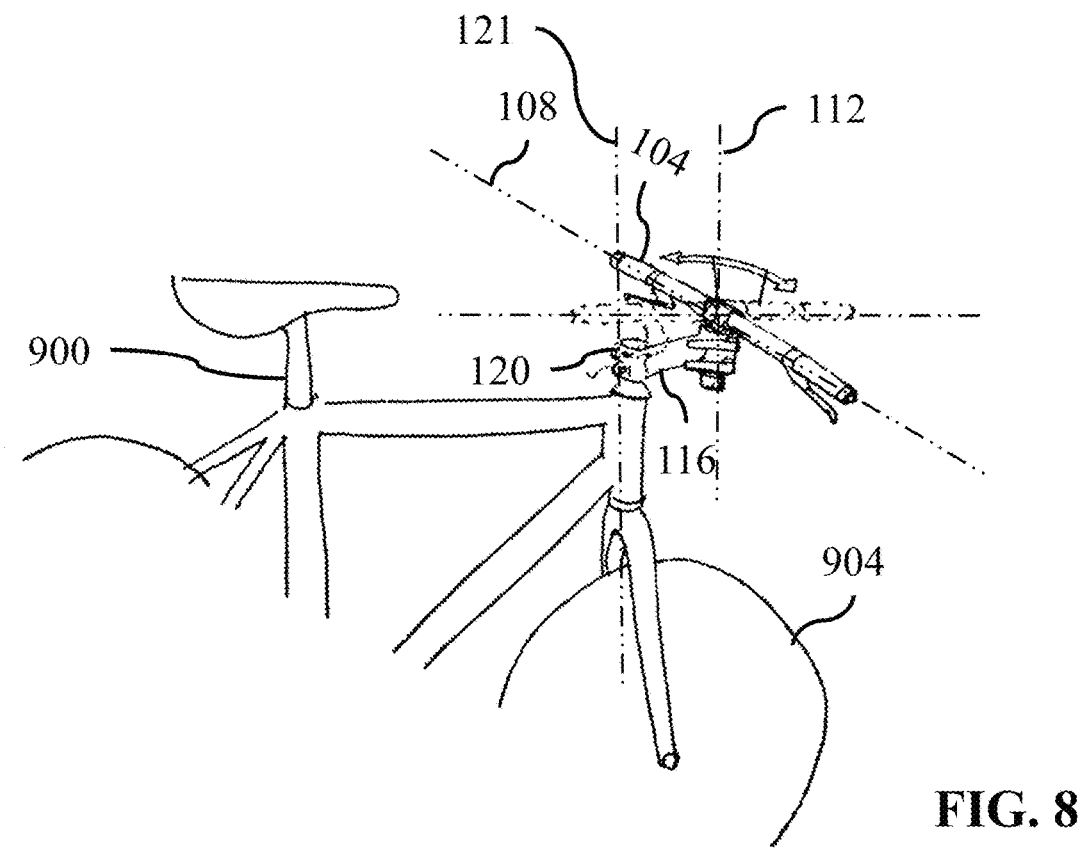

FIG. 7-FIG. 10 depict, in accordance with a third major aspect, embodiments of an engagement device 106 and a clamp assembly 114 configured for utilization in a first elongated portion 102 and a second elongated portion 110 of a vehicle 900. FIG. 6A-FIG. 6F depict embodiments of the vehicle 900. FIG. 7-FIG. 8 depict side views. FIG. 9-FIG. 10 depict perspective views.

The embodiments depicted in FIG. 1-FIG. 2 are applicable to the embodiments depicted in FIG. 7-FIG. 10.

Referring to the embodiment as depicted in FIG. 7, the apparatus is further adapted so that a stem 116 extends radially (sideways) from the first elongated portion 102. The stem 116 has a stem axis 117 extending therethrough. The stem axis 117 intersects the common axis 112. In accordance with an option, the first elongated portion 102 defines (provides) a cavity 119 configured to provide storage for an item (a small tool and/or a battery) if so desired. More preferably, the apparatus includes a synergistic combination of the stem 116 with the clamp assembly 114 (configured to selectively clamp, and unclamp, the first elongated portion 102 and the second elongated portion 110 with and from each other), the first elongated portion 102, the first mating part 202 (also called a locking tab) positioned on (provided by) the first elongated portion 102, and the vehicular handlebar 104 mounted to the first elongated portion 102. The stem 116 has a first end with a fork clamp 120. The fork clamp 120 is configured to clamp the stem 116 to a front fork (holding the front wheel 904 (a rotatable wheel) as depicted in the embodiment of FIG. 8) of the vehicle 900. The stem 116 also has a second end attached to the second elongated portion 110, and in which the second end of the stem 116 is spaced apart from the first end of the stem 116. The first elongated portion 102 is configured to be connectable to the second elongated portion 110. The vehicular handlebar 104 is configured to be securely connected to a portion of the first elongated portion 102. The first elongated portion 102 is configured to be pivotally and slidably connectable to the second elongated portion 110. The clamp assembly 114 is configured to selectively securely bind the first elongated portion 102 to the second elongated portion 110.

A fork clamp 120 (also called a fork connector) is positioned on one end of the stem 116, and the first elongated portion 102 is positioned at the other end (another end) of the stem 116. A fork axis 121 extends through the fork clamp 120. The fork clamp 120 is configured to be coupled to (directly or indirectly) a front wheel 904 (a rotatable wheel) of the vehicle 900 (as depicted in the embodiment of FIG. 8).

The first elongated portion 102 may be called a handlebar post, a vertically movable handlebar support post, a vertical handlebar support post, etc. The second elongated portion 110 may be called a stem head, etc. The first elongated portion 102 is configured to be movable relative to the second elongated portion 110. The clamp assembly 114 may be called (or include) a quick-release clamp, a quick-release skewer, etc.

Referring to the embodiment as depicted in FIG. 7, the clamp assembly 114 includes a first clamp 114A and a second clamp 114B that is spaced apart from the first clamp 114A (also called clamping head levers). The clamp assembly 114 is configured to be secured in a closed position to prevent inadvertent twisting of the first elongated portion 102 (along the common axis 112). The preferred (desired) vertical height or vertical position (a predetermined height, set vertical height or position) and/or the angular position of the vehicular handlebar 104 for riding is determined by where (the spatial orientation) the first mating part 202 (which is provided by the first elongated portion 102), in use, mates to (is received by, engages) the second mating portion 204 (which is provided by the second elongated portion 110).

Referring to the embodiment as depicted in FIG. 7, the second mating portion 204 is built into the second elongated portion 110 below the base of the handlebar clamp 122. The second mating portion 204 provides the user with tactile feedback that the vehicular handlebar 104 is in the correct position for riding when the first mating part 202, in use, engages with the second mating portion 204 located on the top of the second elongated portion 110.

Referring to the embodiment as depicted in FIG. 7, the first mating part 202 (also called a locking tab) is fixed on (extends from) the first elongated portion 102 (preferably, the first mating part 202 is integrated to the first elongated portion 102). The first mating part 202 is positioned in a fixed location on the first elongated portion 102 above the clamp assembly 114.

Referring to the embodiment as depicted in FIG. 7, the engagement device 106 (also called a lock assembly) includes (A) the first mating part 202 extending from the first elongated portion 102, and (B) the second mating portion 204 defined by (provided by) the second elongated portion 110. The second mating portion 204 may be called a notch, a recessed locking notch, a groove, etc.

Referring to the embodiment as depicted in FIG. 7, there is provided a handlebar clamp 122 configured to extend (upwardly) from the first elongated portion 102. The handlebar clamp 122 is configured to selectively secure the vehicular handlebar 104 to the top portion of the first elongated portion 102.

Referring to the embodiment as depicted in FIG. 8, the apparatus is configured to facilitate rotation of the vehicular handlebar 104 to achieve greater selective compactness of the vehicle 900.

Referring to the embodiment as depicted in FIG. 9, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically.

Referring to the embodiment as depicted in FIG. 10, the vehicular handlebar 104 is positioned in a non-riding position, in which the vehicular handlebar 104 is in the correct position or orientation for a handlebar disablement of the vehicular handlebar 104.

Referring to the embodiments as depicted in FIG. 9 and FIG. 10, the apparatus is configured to allow a vehicular handlebar 104 to selectively rotate about 90 degrees between the handlebar-riding position (as depicted in FIG. 9) and the handlebar storage position (as depicted in FIG. 10). Preferably, the apparatus is configured to securely alternately rotate the vehicular handlebar 104 at any one of (A) a perpendicular orientation to the normal riding position (as depicted in FIG. 9), and (B) an orthogonal orientation to the normal riding position (as depicted in FIG. 10). This arrangement may facilitate a relatively slimmer vehicular profile for storage and/or walking (of the vehicle 900).

Referring to the embodiments as depicted in FIG. 9 and FIG. 10, the second elongated portion 110 defines a clamp expansion channel 115. The first elongated portion 102 is configured to be vertically and/or rotatably repositioned within the second elongated portion 110.

Referring to the embodiment as depicted in FIG. 9, the rotational position of the vehicular handlebar 104 is set once the first mating part 202 is securely slotted into (received by) the second mating portion 204. The second mating portion 204 is positioned along a perimeter of the first elongated portion 102. Tactile feedback is provided to the user when the first mating part 202 drops into the second mating portion 204.

Referring to the embodiment as depicted in FIG. 9, the vehicular handlebar 104 may be secured in a normal riding position (as depicted in FIG. 9) when the first mating part 202 (the locking tab) is aligned with the second mating portion 204 (also called a recessed notch) located on or defined by the first elongated portion 102 (also called a clamping head or movable clamp head). In the handlebar usage position (as depicted in FIG. 9), the vehicular handlebar 104 is aligned (approximately) orthogonally from (relative to) the stem axis 117.

Referring to the embodiment as depicted in FIG. 9, once the first mating part 202 is received into the second mating portion 204 and the clamp assembly 114 is closed (activated), the vertical riding position for the vehicular handlebar 104 is fixed. The second elongated portion 110 is clamped to the first elongated portion 102 and secured with the clamp assembly 114. The clamp assembly 114 may be called a clamp assembly, a locking quick release lever, or a lock lever.

Referring to the embodiment as depicted in FIG. 9. the vehicular handlebar 104 is configured to be rigidly and securely fixed into the riding position by closing the clamp assembly 114 (in this manner, the vehicular handlebar 104 (which is clamped to the first elongated portion 102) is selectively clamped or affixed to the second elongated portion 110 while at the same time the first mating part 202 is mated with the second mating portion 204 (as depicted in FIG. 7).

Referring to the embodiment as depicted in FIG. 10, the first elongated portion 102 is configured to be vertically adjustable and/or rotatable in such a way that the vehicular handlebar 104 may be vertically positioned to a desired (predetermined) vertical height or a vertical height (preferably, allowing greater vertical clearance between the brake levers 901, shifters, cables and the rest of the vehicle 900).

Referring to the embodiments as depicted in FIG. 9-FIG. 10, the first mating part 202 is removed (removable or lifted to be removed) from the second mating portion 204 defined by the second elongated portion 110 (as depicted in FIG. 9). The first mating part 202 is vertically separated (physically separated) from the second mating portion 204 of the second elongated portion 110. Deactivation of the clamp assembly 114, in use, allows the vehicular handlebar 104 to rotate for compactness (of the vehicle 900, as depicted in FIG. 10). Once the clamp assembly 114 is deactivated, the first elongated portion 102 and the second elongated portion 110 are not affixed to each other, and the first elongated portion 102 and the vehicular handlebar 104 (in unison) are free to be rotated (rotatable) about the common axis 112.

Referring to the embodiment as depicted in FIG. 10, in the handlebar storage position (as depicted in FIG. 10), the vehicular handlebar 104 is aligned (approximately) parallel to (relative to) the stem axis 117 of the stem 116. In the handlebar storage position, the required space for storing the vehicle 900 may be reduced. For instance, the apparatus is configured to allow for more consistent spacing and stacking of bicycles positioned in a storage rack. The thinner non-riding profile (of the bicycle, as depicted in FIG. 10) may allow the bicycles stored in the storage rack to be more easily retrieved from and/or stored to the storage rack, with reduced concern for inadvertent bumping into adjacent bicycles (since the vehicular handlebar 104 has been folded into the folded position, as depicted in FIG. 10). Generally, the first elongated portion 102 (and the vehicular handlebar 104) is configured to be rotatable (relative to) the second elongated portion 110, for a relatively narrower profile of the vehicle 900 (as depicted in FIG. 10).

Referring to the embodiment as depicted in FIG. 10, the apparatus is configured to allow the vehicular handlebar 104 to be selectively rotatable and selectively lockable in the storage position for a relatively thinner profile of the bicycle (for walking and/or storage of the bicycle). Preferably, the apparatus is configured to allow the bicycle to be stored and/or walked alongside more efficiently and compactly. The vehicular handlebar 104 is configured to be selectively vertically raised and/or selectively lowered by opening (the deactivation of) the clamp assembly 114 and sliding a length of the first elongated portion 102 (up or down, as desired) along (relative to) the second elongated portion 110. The vehicular handlebar 104 is configured to be rotated by rotating the first elongated portion 102 within the second elongated portion 110 while the clamp assembly 114 is opened (deactivated).

Referring to the embodiment as depicted in FIG. 10, the first elongated portion 102 (and the vehicular handlebar 104) are raised to provide vertical clearance for the brake levers 901, shifters and other parts mounted to the vehicular handlebar 104, thereby avoiding inadvertent (unwanted) contact with the stem 116 (or other parts of the bicycle) while the vehicular handlebar 104 is rotated (for compactness of the bicycle, as depicted in FIG. 10).

Referring to the embodiment as depicted in FIG. 10, the first mating part 202 is rotated (rotatable) away from the second mating portion 204 defined or provided by the second elongated portion 110 (the vehicular handlebar 104 is rotated for compactness of the bicycle). As depicted, the vehicular handlebar 104 is rotated about 90 degrees, so that a thinner profile of the bicycle is arranged for walking and/or for storage of the vehicle 900 (as the case may be). The selective vertical displacement of the first elongated portion 102 allows for the brake levers 901 to avoid unwanted contact with the other parts of the vehicle 900 once the vehicular handlebar 104 is rotated (as depicted).

FIG. 11-FIG. 20 depict, in accordance with a fourth major aspect, embodiments of an engagement device 106 and a clamp assembly 114 configured for utilization in a first elongated portion 102 and a second elongated portion 110 of a vehicle 900. FIG. 6A-FIG. 6F depict embodiments of the vehicle 900. FIG. 11, FIG. 15, FIG. 19A, FIG. 19B and FIG. 20 depict perspective views. FIG. 12-FIG. 14 and FIG. 16-FIG. 18 depict side views.

The embodiments depicted in FIG. 3-FIG. 5 are applicable to the embodiments depicted in FIG. 11-FIG. 20.

Referring to the embodiment as depicted in FIG. 11-FIG. 14, it will be appreciated that aspects of the apparatus may place and/or locate the engagement device 106 at any position relative to the first elongated portion 102 and the second elongated portion 110. In accordance with a preferred embodiment, the engagement device 106 is (at least in part thereof) included with a collar assembly 301 configured to be movable along a length of the first elongated portion 102 (and is selectively positionable and axially lockable to the first elongated portion 102 once positioned accordingly). It will be appreciated that the collar assembly 301 may be placed either above or below the second elongated portion 110. The second elongated portion 110 surrounds, at least in part, the outer circumference or outer surface of the first elongated portion 102. The collar assembly 301 may be called a positional stop collar, a positioning collar, positional collar, etc. The collar assembly 301 is configured to be rotatably and/or slidably positioned around the first elongated portion 102. The collar assembly 301 is configured to be selectively securable to an outer surface of the first elongated portion 102 (along an axial length of the first elongated portion 102). The collar assembly 301 is configured to be securely locked to the first elongated portion 102 at a desired position on the first elongated portion 102.

Referring to the embodiment as depicted in FIG. 11-FIG. 14, the engagement device 106 includes the first mating portion 302 extending from the collar assembly 301, and the engagement device 106 includes the second mating portion 204 defined by the second elongated portion 110. The components of the engagement device 106 are distributed on the collar assembly 301 and the second elongated portion 110. It will be appreciated that in accordance with an alternative, the engagement device 106 includes the first mating portion 302 extending from (provided by) the second elongated portion 110, and the engagement device 106 includes the second mating portion 204 defined by (provided by) the collar assembly 301 (if so desired).

Referring to the embodiment as depicted in FIG. 11-FIG. 14, the collar assembly 301 is positioned (positionable) or located (locatable) below the second elongated portion 110. The vertical position (vertical height) of the vehicular handlebar 104 is settable for permitting a user to ride the vehicle 900, by moving (pulling upwardly on) the vehicular handlebar 104 until the first mating portion 302 (extending from the collar assembly 301), in use, abuts (contacts or is received by) the bottom edge of the second mating portion 204 of the second elongated portion 110, so that the second mating portion 204 (of the second elongated portion 110), in use, receives (engages) and interfaces with the first mating portion 302 (of the collar assembly 301).

Figure 12:
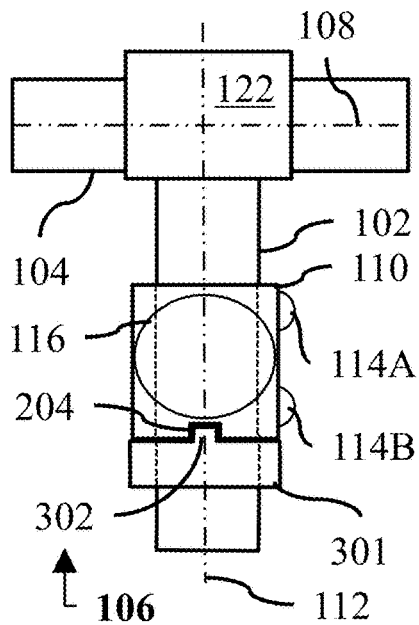

Referring to the embodiment as depicted in FIG. 12, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically.

Figure 14:
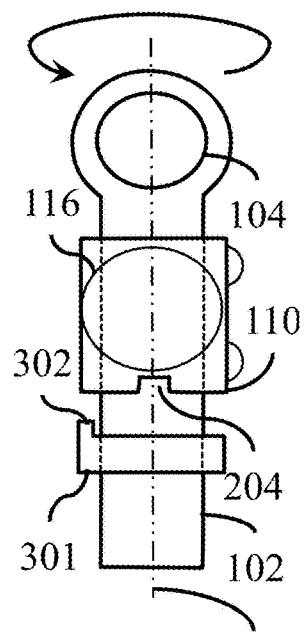

Referring to the embodiment as depicted in FIG. 14, the vehicular handlebar 104 is positioned in a non-riding position, in which the vehicular handlebar 104 is in the correct position or orientation for handlebar disablement of the vehicular handlebar 104.

Referring to the embodiment as depicted in FIG. 12, once the first mating portion 302 and the second mating portion 204 are engaged (mated) with each other, the user is not able to rotate the first elongated portion 102 (and the vehicular handlebar 104) relative to the second elongated portion 110. The user may obtain tactile feedback from (by touching) the first mating portion 302 and the second mating portion 204 so that the user may determine whether the riding position of the vehicular handlebar 104 has been set up accordingly. Inadvertent twisting of the vehicular handlebar 104 is prevented once the clamp assembly 114 is activated to clamp the first elongated portion 102 to the second elongated portion 110 (additional resistance to twisting is provided by the first mating portion 302 and the second mating portion 204, as depicted in FIG. 12). The clamp assembly 114 is configured to securely hold (maintain) the vehicular handlebar 104 at a desired vertical position (a vertical height). This configuration allows the vehicular handlebar 104 to be selectively movable (such as, to a lower vertical height), and then rotatable, thereby improving the compactness of the bicycle. This configuration may be useful for small-wheeled folding bicycles (for the case where the second elongated portion 110 may provide great variability of the vertical height of the vehicular handlebar 104, for riding and/or storage of the bicycle, as the case may be).

Figure 13:
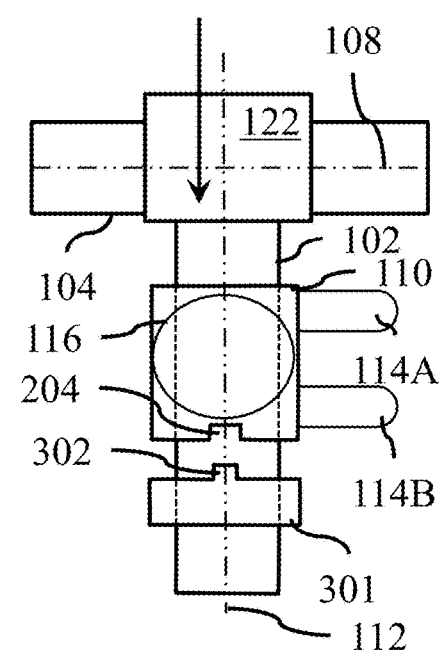

Referring to the embodiment as depicted in FIG. 13, the clamp assembly 114 is configured to be selectively deactivated, and the vehicular handlebar 104 and the first elongated portion 102 are movable (in unison since the first elongated portion 102 and the vehicular handlebar 104 are affixed to each other), by the user, to a different vertical height (such as, a lower vertical height as depicted in FIG. 13), and the first mating portion 302 and the second mating portion 204 are selectively disengaged from each other once the first elongated portion 102 is vertically moved (once the clamp assembly 114 is deactivated). The first mating portion 302 and the second mating portion 204 are spaced apart from each other along a linear vertical distance.

Referring to the embodiment as depicted in FIG. 14 and FIG. 15, the vehicular handlebar 104 and the first elongated portion 102 are rotatable (in unison). The second mating portion 204 and the first mating portion 302 are rotated away from each other. The first clamp 114A and the second clamp 114B are selectively activated to lock the position of the first elongated portion 102 and the vehicular handlebar 104 (in unison) with the second elongated portion 110 (so that the vehicular handlebar 104 and the first elongated portion 102, in use, cannot be further rotatable relative to the second elongated portion 110).

Referring to the embodiment as depicted in FIG. 15-FIG. 18, FIG. 19A and FIG. 19B, the collar assembly 301 is positionable or locatable above the second elongated portion 110. The collar assembly 301 is selectively slidable along an axial length of the first elongated portion 102 (once the clamp assembly 114 is selectively deactivated). The first mating portion 302 extends from (is provided by) the collar assembly 301. The apparatus is configured to allow the user to selectively set (set up) a vertical position of the vehicular handlebar 104 that is comfortable for the riding (operation) of the vehicle 900. The collar assembly 301 is configured to be selectively securely affixed to the first elongated portion 102, once the collar clamp 314 (such as a pinch bolt, etc.) of the collar assembly 301 is activated (such as, tightened), accordingly. This configuration may be useful for conventional full-sized bicycles for the case where there is a need for a small variation in handlebar height while still providing the ability to rotate the vehicular handlebar 104 (for improved portability of the vehicle 900).

Referring to the embodiment as depicted in FIG. 16, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically.

Referring to the embodiment as depicted in FIG. 18, the vehicular handlebar 104 is positioned in a non-riding position, in which the vehicular handlebar 104 is in the correct position or orientation for the handlebar disablement of the vehicular handlebar 104.

Referring to the embodiment as depicted in FIG. 16, once the first mating portion 302 and the second mating portion 204 are engaged (mated) with each other, the user is not able to rotate the first elongated portion 102 (and the vehicular handlebar 104) relative to the second elongated portion 110. The user may obtain tactile feedback from (by touching) the first mating portion 302 and the second mating portion 204 so that the user may determine whether the riding position of the vehicular handlebar 104 has been set up accordingly. Inadvertent twisting of the vehicular handlebar 104 is prevented once the clamp assembly 114 is activated to clamp the first elongated portion 102 to the second elongated portion 110 (additional resistance to twisting is provided by the first mating portion 302 and the second mating portion 204, as depicted in FIG. 12). The clamp assembly 114 is configured to securely hold (maintain) the vehicular handlebar 104 at a desired vertical position (a vertical height). This configuration allows the vehicular handlebar 104 to be selectively movable (such as, to a higher vertical height), and then rotatable, thereby improving the compactness of the bicycle. This configuration may be useful for small wheeled-folding bicycles because the second elongated portion 110 may provide great variability of the vertical height of the vehicular handlebar 104 for riding and/or storage of the bicycle (as the case may be).

Referring to the embodiment as depicted in FIG. 17, the clamp assembly 114 is selectively deactivated, and the vehicular handlebar 104 and the first elongated portion 102 are movable (in unison since the first elongated portion 102 and the vehicular handlebar 104 are affixed to each other), by the user, to a different (higher) vertical height. The first mating portion 302 and the second mating portion 204 are selectively disengaged from each other once the first elongated portion 102 is vertically moved. The first mating portion 302 and the second mating portion 204 are spaced apart from each other along a linear vertical distance.

Referring to the embodiment as depicted in FIG. 18, the vehicular handlebar 104 and the first elongated portion 102 are rotatable (in unison). The second mating portion 204 and the first mating portion 302 are rotated away from each other. The first clamp 114A and the second clamp 114B are selectively activated to lock the position of the first elongated portion 102 and the vehicular handlebar 104 (in unison) with the second elongated portion 110 (so that the vehicular handlebar 104 and the first elongated portion 102, in use, cannot be further rotatable relative to the second elongated portion 110).

Figure 19A:
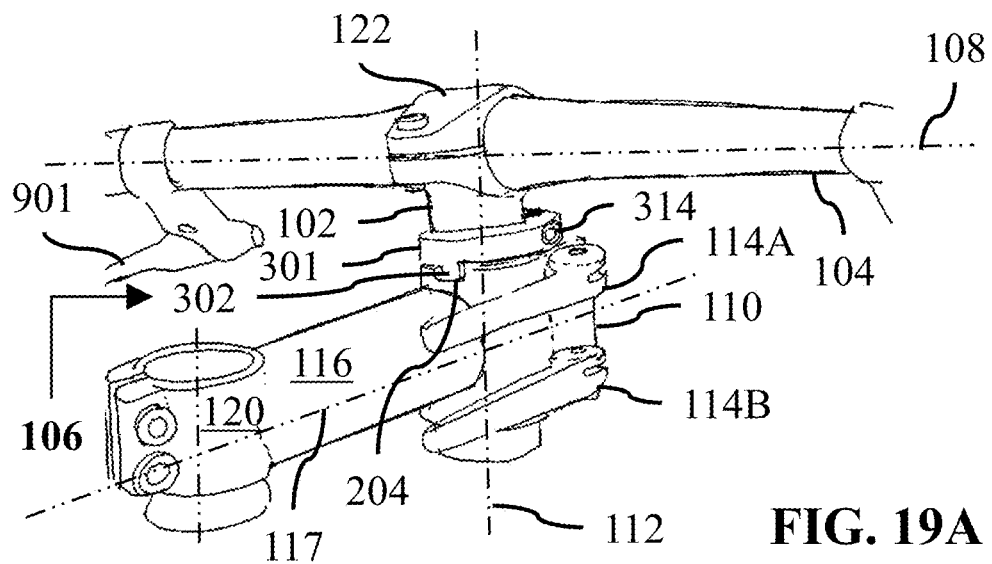

Referring to the embodiment as depicted in FIG. 19A, the vehicular handlebar 104 is set up for a relatively lower vertical height (in the riding position), for the comfort of the user.

Figure 19B:
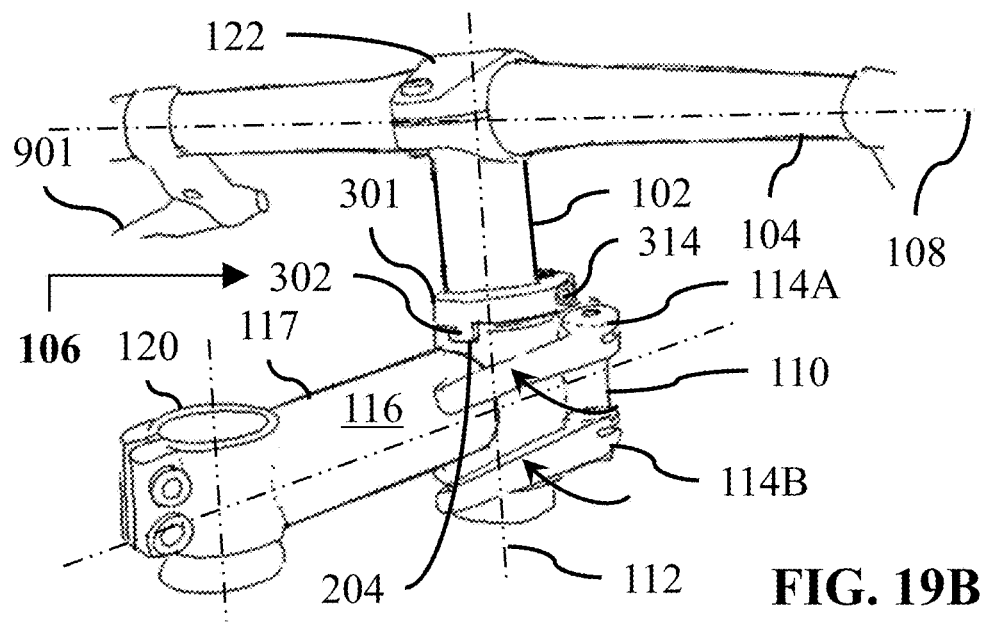

Referring to the embodiment as depicted in FIG. 19B, the vehicular handlebar 104 is set up for a relatively higher vertical height (in the riding position), for the comfort of the user.

Figure 20:
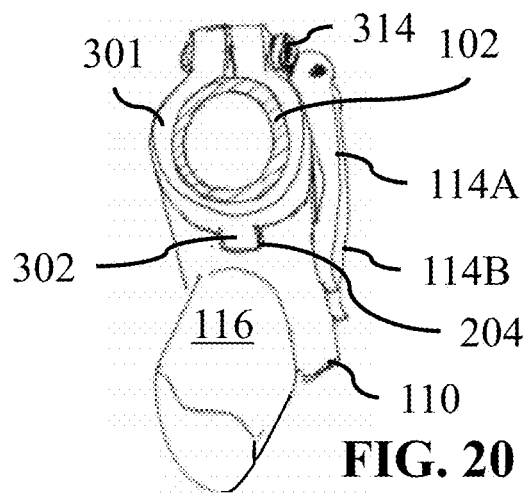

Referring to the embodiment as depicted in FIG. 20, the collar assembly 301 is depicted in a partial perspective view with the first elongated portion 102, the second elongated portion 110 and the clamp assembly 114.

FIG. 21-FIG. 33 depict, in accordance with a fifth major aspect, embodiments of an engagement device 106 and a clamp assembly 114 configured for utilization in a first elongated portion 102 and a second elongated portion 110 of a vehicle 900. FIG. 6A-FIG. 6F depict embodiments of the vehicle 900. FIG. 21-FIG. 24, FIG. 28 and FIG. 31-FIG. 33 depict perspective views. FIG. 25-FIG. 27 and FIG. 29-FIG. 30 depict side views.

The embodiments as depicted in FIG. 3-FIG. 5 are also applicable to the embodiments as depicted in FIG. 21-FIG. 33.

Referring to the embodiments as depicted in FIG. 21-FIG. 33, the apparatus is further adapted such that the first elongated portion 102 defines an elongated channel 103 extending along a length of an outer surface of the first elongated portion 102. The collar assembly 301 provides a collar-engagement device 305 extending radially inward. The collar-engagement device 305 may be called a collar protuberance, a finger, etc., and any equivalent thereof. The collar-engagement device 305 is configured to be receivable, at least in part, in the elongated channel 103 in such a way that the collar-engagement device 305 maintains alignment of the collar assembly 301 while the collar assembly 301 is made to travel along a length of the first elongated portion 102.

Referring to the embodiment as depicted in FIG. 21, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically. The clamp assembly 114 is activated (so that the second elongated portion 110 and the first elongated portion 102 are affixed to each other, and the first elongated portion 102 is not movable relative to the second elongated portion 110). The collar clamp 314 is activated (so that the collar assembly 301 is affixed to the first elongated portion 102, and the collar assembly 301 is not movable relative to the first elongated portion 102). The vehicular handlebar 104 is not rotatable along the common axis 112, and the vehicular handlebar 104 is not vertically height adjustable.

Referring to the embodiment as depicted in FIG. 21, the second elongated portion 110 includes a fork steering tube (and any equivalent thereof), in which the front wheel 904 is operatively rotatably mounted to the second elongated portion 110. For this embodiment, the apparatus is usable with (retrofitted to, or installable in) the vehicular handlebar 104 of a folding bike, a hinged folding bicycle (and any equivalent thereof). For instance, the vehicle 900 includes a folding handlebar hinge release lever 903. For this case, the second elongated portion 110 is configured to fold (pivot). The first elongation portion 102 defines or provides the elongated channel 103 (also called a centering channel, a support post locking channel, etc.).

Referring to the embodiment as depicted in FIG. 22, the collar assembly 301 includes the collar-engagement device 305 (also called a cross-sectional tab) configured to match (correspond with) the cross-sectional profile of the elongated channel 103. The collar-engagement device 305 extends radially inward from the collar assembly 301. The engagement device 106 includes the second mating portion 204 and the first mating portion 302. Once the second mating portion 204 (of the second elongated portion 110) receives (mates with) the first mating portion 302 (of the collar assembly 301), the first elongation portion 102, in use, cannot twist (that is, cannot be made to rotate along the common axis 112 of the second elongated portion 110) because the collar-engagement device 305 (of the collar assembly 301) is received by (interfaced with) the elongated channel 103 of the first elongation portion 102. The collar assembly 301 includes the collar clamp 314 (also called a quick-release clamp or a pinch bolt). It is preferred that the collar clamp 314 include a quick-release clamp (for the case where the position of the collar assembly 301 may need to be more viable on a folding-bike application).

Referring to the embodiment as depicted in FIG. 23, the second elongated portion 110 is depicted having an axially-extending expansion slot 111 defined along an outer surface of the second elongated portion 110. The axially-extending expansion slot 111 is configured to improve the clamping effect (activation) of the clamp assembly 114 for selectively affixing the first elongated portion 102 with the second elongated portion 110, when needed or required.

Figure 24:
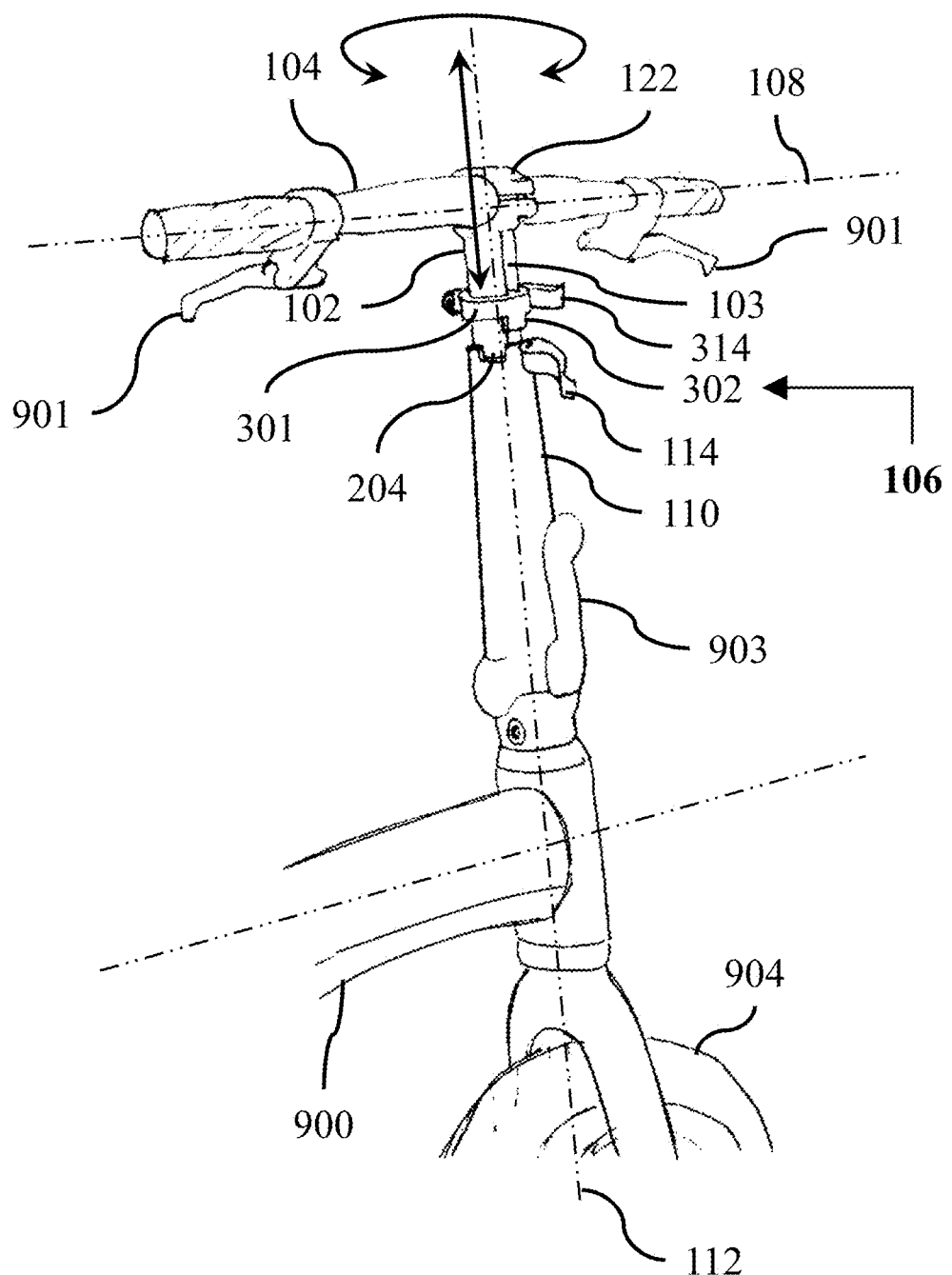

Referring to the embodiment as depicted in FIG. 24, the vehicular handlebar 104 is positioned in a non-riding position, in which the vehicular handlebar 104 is in the correct position or orientation for handlebar disablement of the vehicular handlebar 104. The clamp assembly 114 is deactivated (so that the second elongated portion 110 and the first elongated portion 102 are not affixed to each other, and the first elongated portion 102 is movable relative to the second elongated portion 110). For FIG. 24, the collar clamp 314 is closed or active (activated). It will be appreciated that the collar clamp 314 may be deactivated to select a different vertical placement of (repositioning of) the collar assembly 301 along the first elongated portion 102. The vehicular handlebar 104 is rotatable along the common axis 112, and the vehicular handlebar 104 is vertically height adjustable (for the comfort of the user of the vehicle 900).

Figure 25:
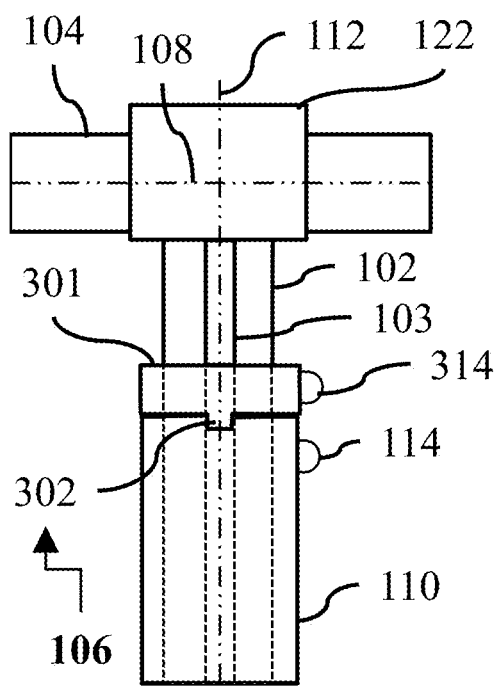

Referring to the embodiment as depicted in FIG. 25, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically. The collar clamp 314 is activated (so that the collar assembly 301 is affixed to the first elongated portion 102, and is not movable relative to the first elongated portion 102). The clamp assembly 114 is activated (so that the first elongated portion 102 is affixed to the second elongated portion 110, and the first elongated portion 102 is not movable relative to the second elongated portion 110).

Figure 26:
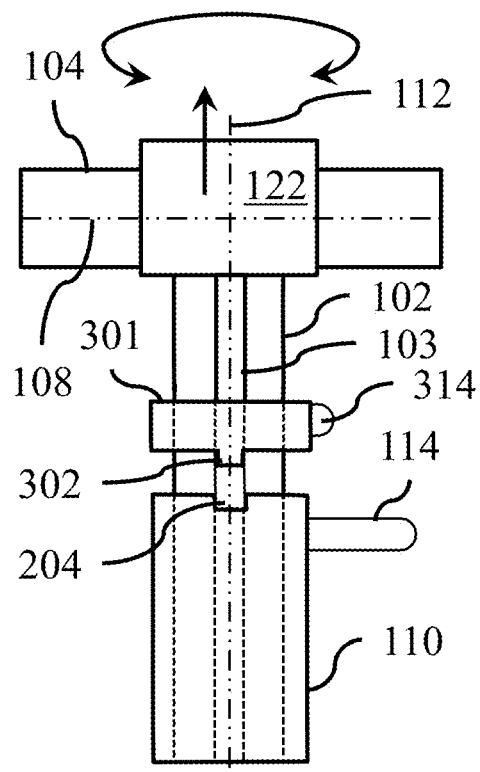

Referring to the embodiment as depicted in FIG. 26, the collar clamp 314 is activated (so that the collar assembly 301 is affixed to the first elongated portion 102, and is not movable relative to the first elongated portion 102). The clamp assembly 114 is deactivated (so that the first elongated portion 102 is not affixed to the second elongated portion 110, and the first elongated portion 102 is movable relative to the second elongated portion 110). The first elongated portion 102 in unison with the vehicular handlebar 104 are lifted (vertically lifted) relative to the second elongated portion 110 (so that the first mating portion 302 and the second mating portion 204 are no longer engaged with each other), and then the first elongated portion 102 and the vehicular handlebar 104 are, in unison, now able to be rotated together relative to the second elongated portion 110 along the common axis 112.

Figure 27:
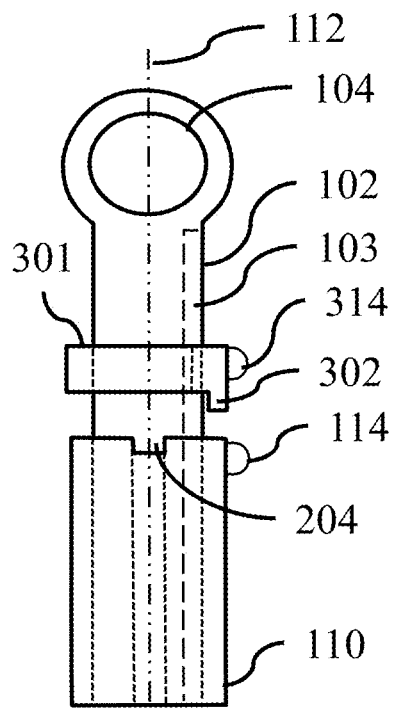

Referring to the embodiment as depicted in FIG. 27, the vehicular handlebar 104 is positioned in a non-riding position for narrower storage, in which the vehicular handlebar 104 is in the correct position or orientation for handlebar disablement of the vehicular handlebar 104. Once the vehicular handlebar 104 and the first elongated portion 102 are rotated in union (unison), the collar clamp 314 is activated (so that the collar assembly 301 is affixed to the first elongated portion 102, and is not movable relative to the first elongated portion 102). The clamp assembly 114 is activated (so that the first elongated portion 102 is affixed to the second elongated portion 110, and the first elongated portion 102 is not movable relative to the second elongated portion 110).

Figure 28:
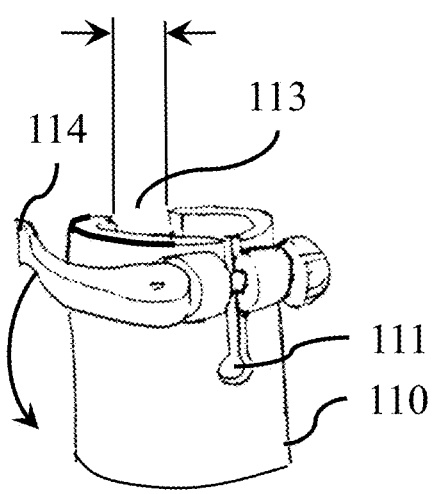

Referring to the embodiment as depicted in FIG. 28, the second elongated portion 110 further includes an expansion feature (slot) configured to further enhance (improve) activation of the clamp assembly 114. It will be appreciated that FIG. 28 is a duplicate of FIG. 23, and FIG. 28 is provided for the convenience for the understanding of FIG. 25-FIG. 27.

Figure 29:
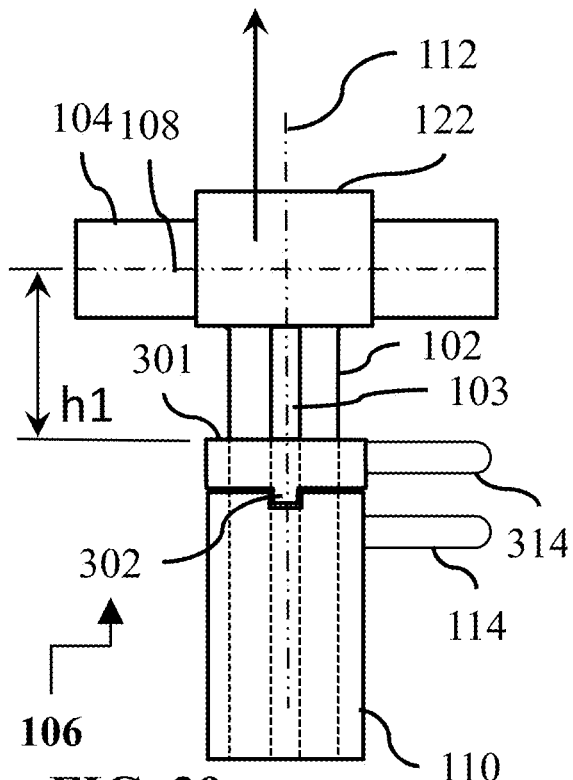
Figure 30:
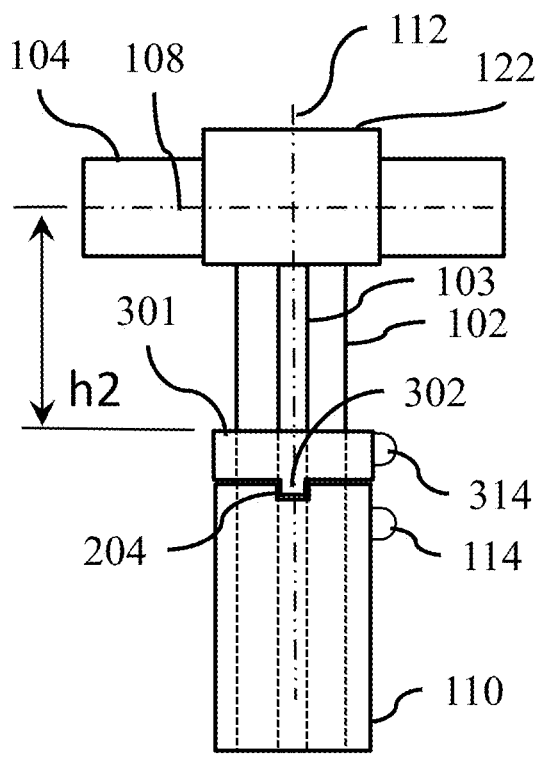

Referring to the embodiment as depicted in FIG. 29, the clamp assembly 114 and the collar clamp 314 are both deactivated. The vertical height of the vehicular handlebar 104 is set at height [h1]. The first elongated portion 102 and the vehicular handlebar 104 are moved vertically (such as vertically higher) relative to the second elongated portion 110 (from height [h1], as depicted in FIG. 29 to height [h2], as depicted in FIG. 30). As depicted in FIG. 29, the vehicular handlebar 104 and the first elongated portion 102 are not rotatable in unison as a result of the engagement between the collar-engagement device 305 of the collar assembly 301 and the elongated channel 103 of the first elongated portion 102, also depicted in FIG. 22. While the vehicular handlebar 104 and the first elongated portion 102 are moved linearly along a length of the common axis 112, the user holds (grips) the collar assembly 301 and the second elongated portion 110 (as depicted in the embodiment of FIG. 31).

Referring to the embodiment as depicted in FIG. 30, the clamp assembly 114 and the collar clamp 314 are both activated. The first elongated portion 102 and the vehicular handlebar 104 are not movable vertically (such as vertically higher) relative to the second elongated portion 110 along a length of the common axis 112. The vertical height of the vehicular handlebar 104 is set at height [h2]. As depicted in FIG. 30, the vehicular handlebar 104 and the first elongated portion 102 are not rotatable in unison as a result of the engagement between the collar-engagement device 305 of the collar assembly 301 and the elongated channel 103 of the first elongated portion 102 (also depicted in FIG. 22) and the connection of the first mating portion 302 to the second mating portion 204.

Figure 31:
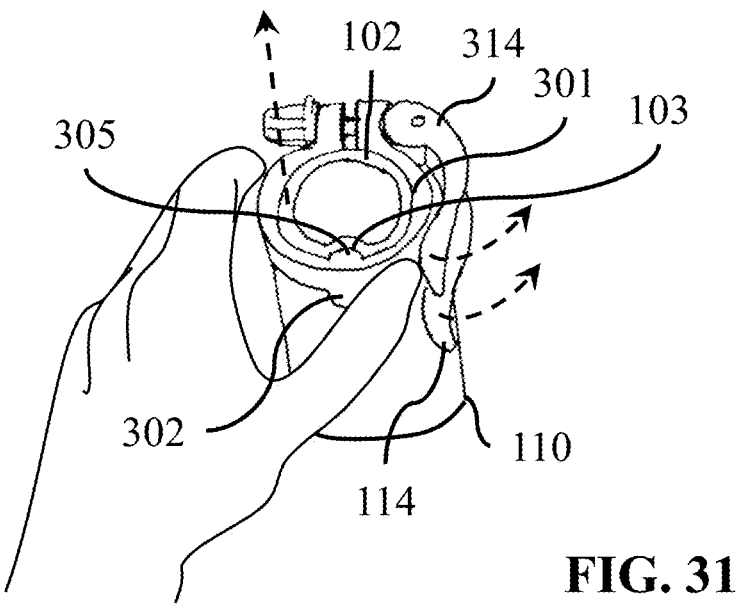

Referring to the embodiment as depicted in FIG. 31, while the vehicular handlebar 104 and the first elongated portion 102 are moved linearly along a length of the common axis 112, the user holds (grips) the collar assembly 301 and the second elongated portion 110 (as depicted in the embodiment of FIG. 31). It will be appreciated that for FIG. 31, the clamp assembly 114 and the collar clamp 314 are depicted in the activated state (closed), and the collar clamp 314 and the clamp assembly 114 are to be deactivated (or placed in open position) in order to thereby permit the first elongated portion 102 to be movable along the common axis 112 relative to the second elongated portion 110 (in which the second elongated portion 110 remains relatively stationary). The vehicular handlebar 104 remains fixed to the first elongated portion 102, and the vehicular handlebar 104 is movable in unison with the first elongated portion 102.

Figure 32:
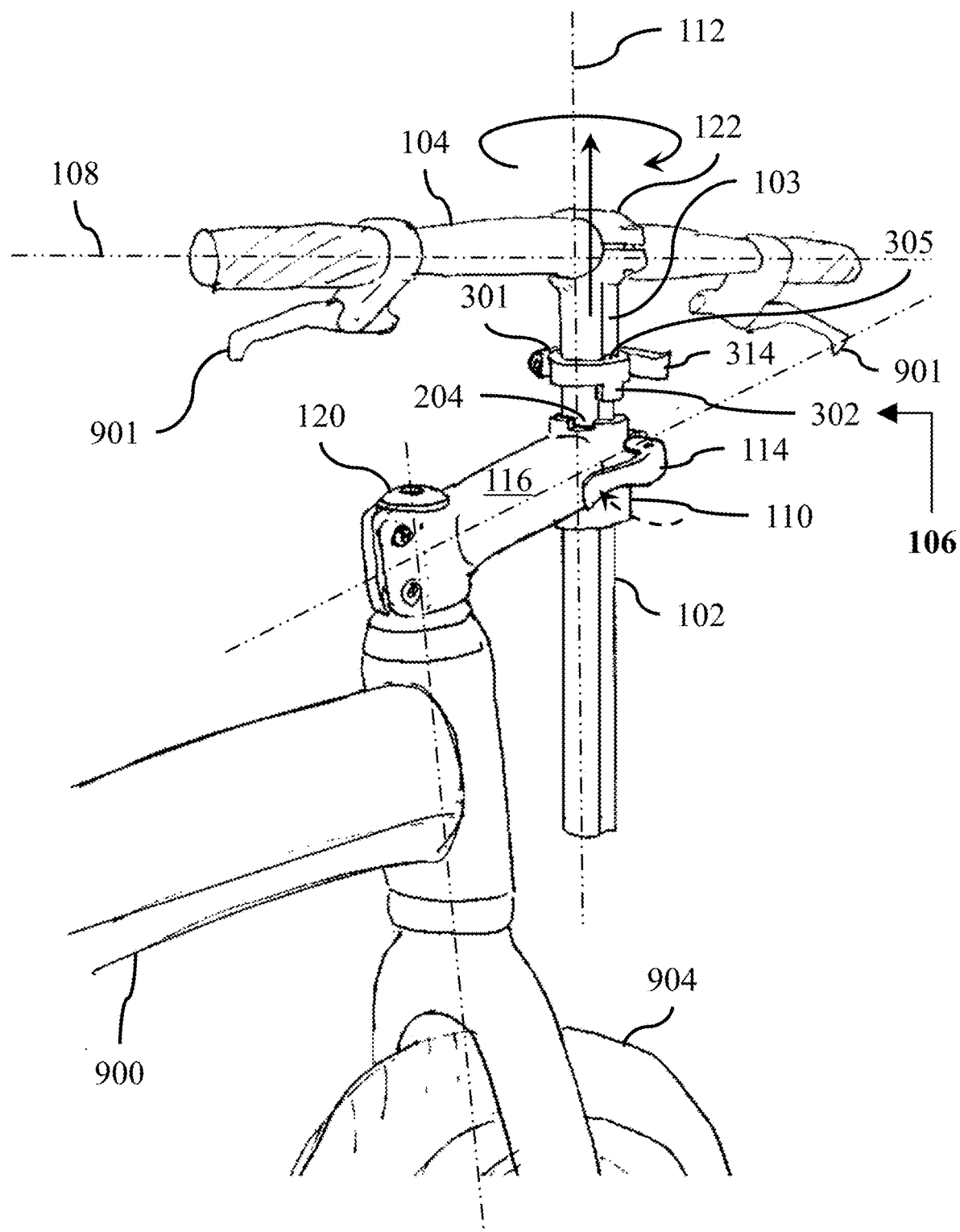

Referring to the embodiment as depicted in FIG. 32, the vehicular handlebar 104 is positioned in a non-riding position, in which the vehicular handlebar 104 is in the correct position or orientation for handlebar disablement (for and/or compactness) of the vehicular handlebar 104.

Figure 33:
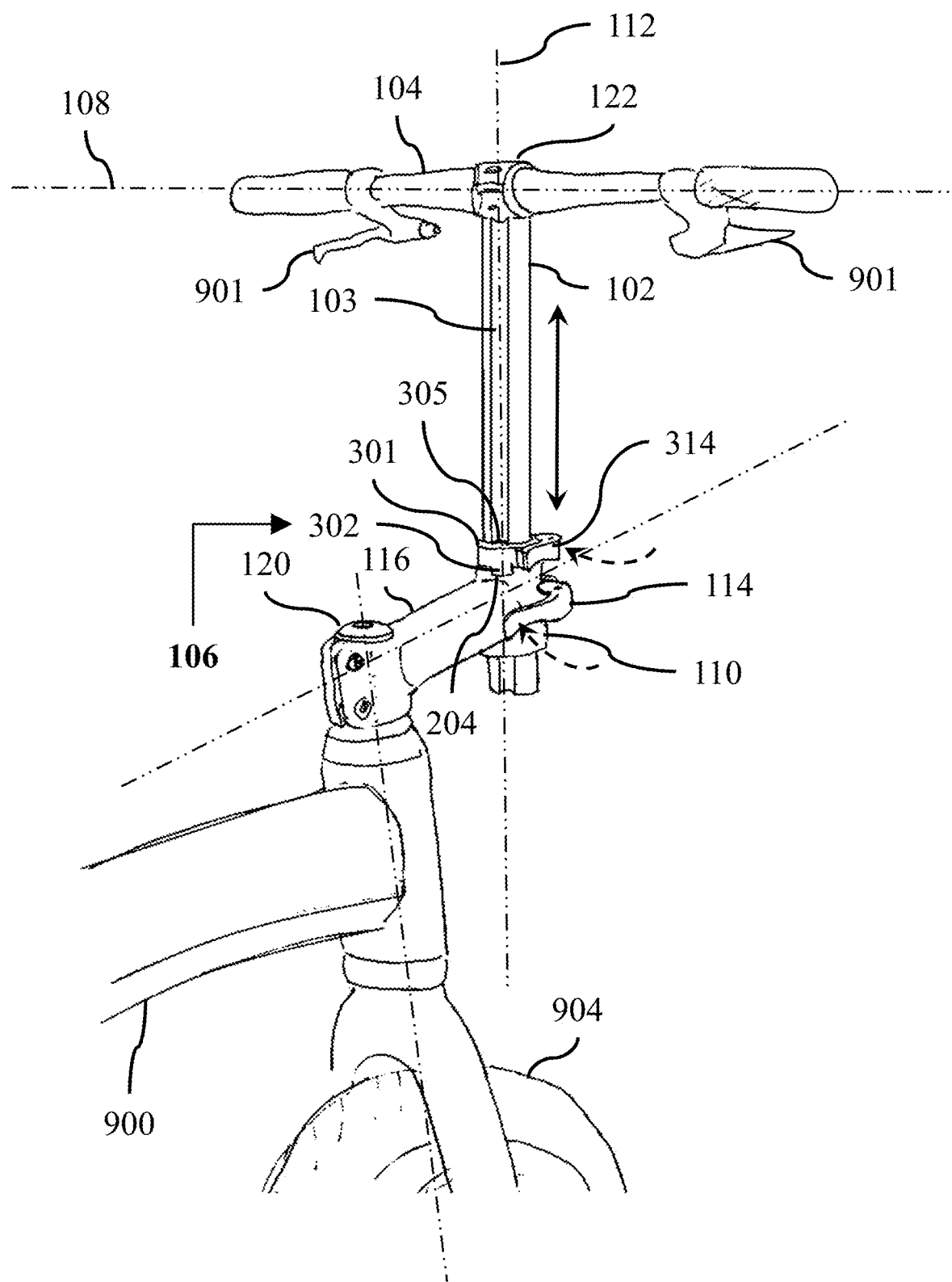

Referring to the embodiment as depicted in FIG. 33, the vehicular handlebar 104 is positioned in a handlebar-riding position, in which the vehicular handlebar 104 is in the correct position or orientation for the user to control the operation (orientation) of the vehicular handlebar 104 of the bicycle, or the vehicle 900, more specifically. The stem 116 extends radially from the first elongated portion 102. The stem 116 has a first end with the fork clamp 120 (in a manner similar to the embodiment as depicted in FIG. 7).

ADDITIONAL DESCRIPTION

In accordance with preferred embodiments, there is provided an adjustable handlebar stem system for bicycles or vehicles that allows the handlebar to rotate and lock in position for a thinner profile for walking and storage.

The aspects of (the preferred embodiments of) the present invention relate to improvements in the technology relating to personal transportation devices, and more particularly to bicycles to allow them to be stored and walked alongside more efficiently and compactly.

In accordance with preferred embodiments, there is provided an improved handlebar and stem assembly that provides bicycles, and other vehicles with similar fork and steering assemblies, greater compactness by allowing the handlebar to be quickly rotated and vertically repositioned via a pivotal clamping connection on the head of the main stem. This improved assembly allows most bicycles to be at least fifty percent (50%) narrower and easier to walk beside when the handlebar is pivoted.

In accordance with preferred embodiments, there is provided a handlebar and stem assembly that consists of a main stem with a quick-release clamping head, a vertical handlebar support post, a locking tab mounted on the said support post, and a handlebar mounted to the support post. The handlebar can be secured in the normal position for riding when a locking tab is aligned within a recessed notch on the clamping head and the clamping head quick release levers are secured in the closed position to prevent twisting of the support post. The preferred vertical position and/or angular position (predetermined or set vertical position and/or angular position) of the handlebar for riding is determined by where the locking tab, in use, mates to the clamping head of the main stem. The locking tab may be part of a movable locking collar assembly or it can be fixed on the handlebar support post. The support post also provides a tubular interior space for storing accessories such as batteries and/or hand tools, for example.

As world populations increase there will be an increasing need for portable personal transportation devices to get around efficiently in cities. Bicycles and other personal vehicles are efficient at moving people and goods but can be difficult to store or walk with in dense urban spaces or narrow spaces such as hallways, or train platforms because of the wide berth needed to avoid contacting the handlebars with the surroundings.

In accordance with preferred embodiments, there is provided any solutions that can decrease the overall cubic volume of the vehicle or bicycle would be of great benefit in terms of saving on storage space, lowering real estate costs, and improving ease of handling of the vehicle. The wide profile of handlebars makes bicycles more difficult to be locked and stored beside each other and makes it harder for the riders to enter into and exit large bike parking lots without hitting their handlebar against other vehicles.

In accordance with preferred embodiments, there is provided a stem system that allows handlebars to rotate about ninety (90) degrees for storage would reduce the space required to store a bicycle by approximately half and it would allow for more consistent spacing and stacking of bicycles in storage racks. The thinner stored profile would also allow the bicycles to be more easily retrieved from the storage racks without the concern of bumping into adjacent vehicles.

While there are other stems in the market that allow the handlebar to be rotated for a narrower profile, the majority of them rotate the entire stem assembly at the axis of the fork steering tube 121. This creates a wider and more asymmetrical folded width compared to pivoting at the head of the stem as the preferred embodiments of this invention proposes.

In accordance with preferred embodiments of the invention, the aspects also allow for a vertically adjustable handlebar post which can make rotation of the handlebar easier by allowing greater vertical clearance between the brake levers, shifters, cables and the rest of the bicycle. Also the vertically adjustable handlebar support post can act as an aid for a more customizable rider fit and thus provide greater comfort. The tubular cavity within the handlebar support post can also provide storage for small tools and battery packs.

The primary objective of, in accordance with preferred embodiments of the present invention, the embodiments allow a secure method to alternately rotate the handlebar perpendicular to the normal riding position to facilitate a slimmer vehicle profile for storage and walking.

In accordance with preferred embodiments, applications of the aspects of the invention depend on the placement and fixture of the locking tab. The locking tab can be part of a movable locking collar. The locking collar can be placed either above or below the clamping head of the main stem. The locking tab can also be positioned in a fixed location on the handlebar support post above the clamping head of the main stem.

The components of the preferred embodiments of the invention include a stem, a handlebar support post clamp, an expansion slot, quick release clamp levers, a steering tube clamp, a locking tab stop interface, an adjustable locking collar with locking tab, an expansion slot, a locking tab, a pinch bolt, a handlebar support post, a handlebar connection, a handlebar, a fixed locking tab (not part of locking collar assembly), an optional battery pack or tool stored into tubular cavity of handlebar support post.

In accordance with preferred embodiments, there is provided a sample folding bicycle containing the stem and handlebar assembly.

In accordance with preferred embodiments, there is provided relational connections between the clamp on the main stem, the locking collar, the vertical handlebar support post, and the handlebar secured into riding position.

In accordance with preferred embodiments, there is provided the relational connections between the clamp on the main stem, the locking collar, the vertical handlebar support post, and the handlebar when the handlebar has been rotated and lowered for greater compactness of the bicycle.

In accordance with preferred embodiments, there is provided the parts that interface between the locking collar and the clamping head of the stem.

In accordance with preferred embodiments, there is provided the expansion slots on the clamping head and the locking collar. It also shows the pinch bolt on the locking collar and the quick release levers that are on the clamping head.

In accordance with preferred embodiments, there is provided the locking collar positioned above the clamping head of the stem with the locking tab engaged into the stop.

In accordance with preferred embodiments, there is provided a fixed locking tab (instead of a separate movable locking collar) inserted into the stop on the clamping head of the stem.

In accordance with preferred embodiments, there is provided a fixed locking tab rotated away from the stop on the clamping head and the handlebar is rotated for greater portability. It also illustrates the higher vertical clearance provided by the handlebar support post so that brake levers and shifters do not interfere during the pivoting action.

In accordance with preferred embodiments, there is provided a folding bicycle using the invention with the locking collar positioned below the clamping head of the stem (the handlebar can be placed in in riding and folding positions).

In accordance with preferred embodiments, there is provided a bicycle the fixed locking tab positioned above the clamping head. The handlebar is positionable in riding and folding positions.

In accordance with a preferred embodiment, there is provided a portable battery power pack stored within the first elongated portion 102 (also called a handlebar support post) (that is, stored within the cavity 119 as depicted in FIG. 7).

In accordance with preferred embodiments, the riding position of the handlebar is secured when the stem is rigidly connected to the fork steering tube is clamped by and the head is clamped to the vertical handlebar post by closing quick release cam levers. The locking collar is fixed into a position along the handlebar support post and it abuts directly against the clamp with the locking tab recessed into the notch on the handlebar support post clamp. The interface of the locking tab within the locking tab stop interface prevents twisting of the handlebar within the assembly. The notch can be positioned on the top or bottom edge of the head. The rider determines where to position the adjustable locking collar with locking tab along the handlebar support post to provide a fixed handlebar position that best suits his/her riding preference.

In accordance with preferred embodiments, the handlebar is rotated to align with the bicycle frame and the vertical position has been lowered. The steps required to reposition the handlebar are: open the clamping levers; then slide the handlebar support post to separate the locking collar (the adjustable locking collar with locking tab) away from recessed interface. The handlebar can then be twisted along the vertical axis of the handlebar support post. The handlebar can be positioned back into riding position by reversing the previous steps. The positive engagement between the locking tab stop interface and the locking tab is easily set by drawing the adjustable locking collar with locking tab towards the handlebar support post clamp and rotating the adjustable locking collar with locking tab along the abutment face of the handlebar support post clamp until a clicking sensation is felt and the rotation of the handlebar post is stopped.

In accordance with preferred embodiments, the clamp (the handlebar support post clamp) has an expansion slot to allow for easy sliding of the vertical post (the handlebar support post) when the clamping levers (the quick release clamp levers) are open. The locking collar (the adjustable locking collar with locking tab) also has an expansion slot and is secured rigidly to the handlebar support post by tightening the pinch bolt.

In accordance with preferred embodiments, the locking collar (the adjustable locking collar with locking tab) is positioned above the clamping head (the handlebar support post clamp) of the stem with the locking tab engaged into the stop (the locking tab stop interface).

In accordance with preferred embodiments, the interface is securely connected via fixed the locking tab (the fixed locking tab) engaged into the stop (the locking tab stop interface).

In accordance with preferred embodiments, the rotation of the handlebar connection is raised and rotated to separate the engagement of the locking tab (the fixed locking tab) from the stop (the locking tab stop interface). This shows the handlebar is rotated perpendicular to the normal riding position and that the raised position of the handlebar connection gives sufficient clearance between the brake levers and shifters from contacting the back of the stem.

In accordance with preferred embodiments, a folding bicycle with the locking collar (the adjustable locking collar with locking tab) is positioned below the clamping head (the handlebar support post clamp) of the stem. The handlebar is positionable in riding and folding positions.

In accordance with preferred embodiments, the bicycle is with the fixed locking tab (the fixed locking tab) positioned above the clamping head (the handlebar support post clamp). The handlebar is positionable in riding and folding positions.

In accordance with preferred embodiments, an optional portable battery power pack (the optional battery pack or tool) with a threaded sleeve threaded and stored within the handlebar support post (such as, the first elongated portion 102).

In accordance with preferred embodiments, there is provided an improved lockable and rotatable handlebar and stem assembly for improving bicycle (or similar vehicles) compactness comprising: a main stem body with a fork clamp at one end and a handlebar support post clamp at the other; the stem body is clamped to the fork steering tube at one end and a clamping head is connected to the handlebar support post at the opposite end; a handlebar support post is pivotally and slidably connected to the clamping head of the main stem body; a handlebar is connected to one end of the handlebar support post; a locking collar with a locking tab is rotatably and slidably positioned around the handlebar support post; one or more recessed locking notches on the clamping head to receive the locking tab of the locking collar; the locking collar is securable to the surface of the handlebar support post; The said clamping head can rigidly and securely fix the position of the support post; the clamping head can be opened when release bindings are opened; the handlebar can be raised or lowered by opening the clamping head and sliding the available support post length within it; the said handlebar can be rotated by rotating the support post within the clamping head; the vertically movable handlebar support post provides clearance for the brake levers, shifters and other handlebar mounted parts to avoid contacting the rear of the stem assembly during the handlebar rotating operation for greater compactness of the vehicle; The handlebar can be rigidly and securely fixed into riding position by closing the release bindings of the clamping head in order to clamp onto the support post while at the same time mating the locking tab of the locking collar into the recessed notch on the clamping head.

In accordance with preferred embodiments, the stem assembly is without an adjustable locking collar. The locking tab function can be built into the handlebar support post below the base of the handlebar connection. This locking tab provides the user with tactile feedback that the handlebar is in the correct position for riding when the tab engages within the recessed locking notch on the top of the clamping head.

In accordance with preferred embodiments, the stem assembly is adapted such that the handlebar support post is a hollow tube which can provide a storage cavity for tools or batteries and other useful interior features.

The following is offered as further description of the embodiments, in which any one or more of any technical feature (described in the detailed description, the summary and the claims) may be combinable with any other one or more of any technical feature (described in the detailed description, the summary and the claims). It is understood that each claim in the claims section is an open ended claim unless stated otherwise. Unless otherwise specified, relational terms used in these specifications should be construed to include certain tolerances that the person skilled in the art would recognize as providing equivalent functionality. By way of example, the term perpendicular is not necessarily limited to 90.0 degrees, and may include a variation thereof that the person skilled in the art would recognize as providing equivalent functionality for the purposes described for the relevant member or element. Terms such as "about" and "substantially", in the context of configuration, relate generally to disposition, location, or configuration that are either exact or sufficiently close to the location, disposition, or configuration of the relevant element to preserve operability of the element within the invention which does not materially modify the invention. Similarly, unless specifically made clear from its context, numerical values should be construed to include certain tolerances that the person skilled in the art would recognize as having negligible importance as they do not materially change the operability of the invention. It will be appreciated that the description and/or drawings identify and describe embodiments of the apparatus (either explicitly or inherently). The apparatus may include any suitable combination and/or permutation of the technical features as identified in the detailed description, as may be required and/or desired to suit a particular technical purpose and/or technical function. It will be appreciated that, where possible and suitable, any one or more of the technical features of the apparatus may be combined with any other one or more of the technical features of the apparatus (in any combination and/or permutation). It will be appreciated that persons skilled in the art would know that the technical features of each embodiment may be deployed (where possible) in other embodiments even if not expressly stated as such above. It will be appreciated that persons skilled in the art would know that other options would be possible for the configuration of the components of the apparatus to adjust to manufacturing requirements and still remain within the scope as described in at least one or more of the claims. This written description provides embodiments, including the best mode, and also enables the person skilled in the art to make and use the embodiments. The patentable scope may be defined by the claims. The written description and/or drawings may help to understand the scope of the claims. It is believed that all the crucial aspects of the disclosed subject matter have been provided in this document. It is understood, for this document, that the word "includes" is equivalent to the word "comprising" in that both words are used to signify an open-ended listing of assemblies, components, parts, etc. The term "comprising", which is synonymous with the terms "including," "containing," or "characterized by," is inclusive or open-ended and does not exclude additional, unrecited (unrecited or non recited) elements or method steps. Comprising (comprised of) is an "open" phrase and allows coverage of technologies that employ additional, unrecited elements. When used in a claim, the word "comprising" is the transitory verb (transitional term) that separates the preamble of the claim from the technical features of the invention. The foregoing has outlined the non-limiting embodiments (examples). The description is made for particular non-limiting embodiments (examples). It is understood that the non-limiting embodiments are merely illustrative as examples.

What is claimed is:

1. An apparatus, comprising:
    an engagement device configured to selectively engage a first elongated portion and a second elongated portion with each other in such a way that the engagement device, in use, prevents the first elongated portion and the second elongated portion from rotating relative to each other along a common axis once the engagement device, in use, selectively engages the first elongated portion and the second elongated portion with each other, in which the first elongated portion is configured to receive and support a vehicular handlebar, of a vehicle, and in which the vehicular handlebar has a handlebar axis extending therethrough, and in which the second elongated portion is configured to receive and support the first elongated portion, and in which the first elongated portion and the second elongated portion are configured to be coaxially aligned along the common axis, and in which the first elongated portion is configured to be slidably received, at least in part, in the second elongated portion; and
    the engagement device also configured to selectively disengage the first elongated portion and the second elongated portion from each other in such a way that the engagement device, in use, permits the first elongated portion and the second elongated portion to rotate relative to each other along the common axis once the engagement device, in use, selectively disengages the first elongated portion and the second elongated portion from each other; and
    a clamp assembly configured to selectively clamp the first elongated portion and the second elongated portion with each other once the engagement device, in use, selectively engages the first elongated portion and the second elongated portion with each other; and
    a stem extending radially from the first elongated portion; and
    the stem having a stem axis extending therethrough; and
    the stem axis intersecting the common axis; and
    the stem having:
        a first end with a fork clamp configured to clamp the stem to a front fork configured to hold a front wheel of the vehicle; and
        a second end attached to the second elongated portion, in which the second end of the stem is spaced apart from the first end of the stem; and wherein the fork clamp is positioned on one end of the stem, and the first elongated portion is positioned at another end of the stem; and the fork clamp is configured to be coupled to the front wheel of the vehicle.

2. The apparatus of claim 1, wherein:

the vehicle includes a bicycle; and the vehicular handlebar is configured to be attached to the bicycle having the first elongated portion and the second elongated portion.

3. The apparatus of claim 1, wherein:

the engagement device includes:

a first mating part being provided by the first elongated portion; and a second mating portion being provided by the second elongated portion; and the first mating part and the second mating portion are configured to mate with each other.

4. The apparatus of claim 1, wherein:

the clamp assembly is mounted to the second elongated portion.

5. The apparatus of claim 1, wherein:

the engagement device includes:

a collar assembly configured to be movable along the first elongated portion; and a first mating portion being provided by the collar assembly; and a second mating portion being provided by the second elongated portion; and the first mating portion and the second mating portion are configured to mate with each other.

6. The apparatus of claim 5, further comprising:

a collar clamp mounted to the collar assembly, and the collar clamp is configured to selectively clamp the collar assembly to the first elongated portion.

7. The apparatus of claim 5, wherein:

the first elongated portion defines an elongated channel extending along the first elongated portion; and the collar assembly provides a collar-engagement device extending radially inward; and the collar-engagement device is configured to be receivable, at least in part, in the elongated channel in such a way that the collar-engagement device maintains alignment of the collar assembly while the collar assembly is made to travel along the first elongated portion.

8. The apparatus of claim 1, wherein:

in a handlebar-riding position, the engagement device, in use, engages and axially aligns the first elongated portion with the second elongated portion in such a way that the handlebar axis, which extends through the vehicular handlebar, and in which the vehicular handlebar is affixed to the first elongated portion and the common axis, which extends through the second elongated portion, are positioned and oriented in the handlebar-riding position; and in the handlebar-riding position, the clamp assembly is activated in such a way that the clamp assembly, in use, clamps, locks and affixes the first elongated portion with the second elongated portion in such a way that the first elongated portion, the vehicular handlebar and the second elongated portion are rotatable in unison and are rotatable along the common axis; and in a non-riding position, the vehicular handlebar is in position and orientation for the handlebar disablement of the vehicular handlebar; and in the non-riding position, the engagement device, in use, disengages the first elongated portion from the second elongated portion, and the first elongated portion and the second elongated portion become axially de-aligned from each other in such a way that the handlebar axis, which extends through the vehicular handlebar and in which the vehicular handlebar is affixed to the first elongated portion and the common axis, which extends through the second elongated portion, are positioned and oriented for the handlebar disablement of the vehicular handlebar; and in the non-riding position, in which the vehicular handlebar is disabled, the clamp assembly is deactivated in such a way that the clamp assembly, in use, unclamps, unlocks and decouples the first elongated portion from the second elongated portion in such a way that the first elongated portion and the vehicular handlebar are rotatable independently from the second elongated portion along the common axis.

9. The apparatus of claim 8, wherein:

the engagement device includes a combination of a first mating part and a second mating portion; and the first mating part includes a pin extending from the first elongated portion; and the second mating portion includes a notch defined by the second elongated portion.

10. The apparatus of claim 1, further comprising:

a collar assembly configured to be movable along the first elongated portion; and wherein:

the collar assembly is configured to receive, at least in part, the first elongated portion; and the collar assembly includes a collar clamp; and the collar clamp is configured to disengage the collar assembly from the first elongated portion in such a way that the collar assembly is freely movable along an axial length of the first elongated portion; and the collar assembly is configured to be repositioned, so that the vehicular handlebar may be repositioned and vertical height adjusted.

11. The apparatus of claim 10, further comprising:

the engagement device includes a combination of a first mating part and a second mating portion; and the first mating part includes a pin extending from the collar assembly; and the second mating portion includes a notch defined by the second elongated portion.

12. The apparatus of claim 11, wherein:

in a handlebar-riding position, the collar clamp of the collar assembly is activated to clamp and lock the collar assembly to the first elongated portion, and the collar assembly does not move relative to the first elongated portion; and in the handlebar-riding position, the engagement device, in use, engages and axially aligns the first elongated portion with the second elongated portion, in which the first mating part of the collar assembly, in use, engages the second mating portion of the second elongated portion, in such a way that the handlebar axis, which extends through the vehicular handlebar and in which the vehicular handlebar is affixed to the first elongated portion and the common axis, which extends through the second elongated portion, are positioned and oriented in the handlebar-riding position; and in the handlebar-riding position, the clamp assembly is activated in such a way that the clamp assembly, in use, clamps, locks and affixes the first elongated portion with the second elongated portion in such a way that the first elongated portion, the vehicular handlebar and the second elongated portion are rotatable in unison and are rotatable along the common axis.

13. The apparatus of claim 11, wherein:

in a non-riding position, in which the vehicular handlebar is in position and orientation for the handlebar disablement of the vehicular handlebar; and in the non-riding position, the collar clamp is deactivated in such a way that the collar assembly is freely movable along the first elongated portion; and in the non-riding position, the engagement device, in use, disengages the first elongated portion from the second elongated portion, in which the first elongated portion and the second elongated portion become axially de-aligned from each other and a first mating portion of the collar assembly, in use, becomes disengaged from the second mating portion of the second elongated portion, in such a way that the handlebar axis, which extends through the vehicular handlebar and in which the vehicular handlebar is affixed to the first elongated portion and the common axis, which extends through the second elongated portion, are positioned and oriented for the handlebar disablement of the vehicular handlebar; and in the non-riding position, the clamp assembly is deactivated in such a way that the clamp assembly, in use, unclamps, unlocks and decouples the first elongated portion from the second elongated portion in such a way that the first elongated portion and the vehicular handlebar are rotatable independently from the second elongated portion along the common axis.

14. The apparatus of claim 1, further comprising:
the engagement device includes:
a first mating part extending from the first elongated portion, and the first mating part is positioned in a fixed location on the first elongated portion above the clamp assembly; and
a second mating portion defined by the second elongated portion, and the second mating portion includes a notch.

15. The apparatus of claim 14, wherein:
the clamp assembly is configured to be secured in a closed position to prevent inadvertent twisting of the first elongated portion along the common axis, and a vertical height and an angular position of the vehicular handlebar are determined by where spatial orientation of the first mating part, which is provided by the first elongated portion, in use, mates to and is received by and engages the second mating portion, which is provided by the second elongated portion.

16. The apparatus of claim 1, wherein:
the engagement device is, at least in part, included with a collar assembly; and
the collar assembly is configured to be movable along a length of the first elongated portion, and is selectively positionable and is axially lockable to the first elongated portion; and
the collar assembly is positionable above or below the second elongated portion; and
the collar assembly is configured to be rotatably and slidably positioned around the first elongated portion; and
the collar assembly is configured to be selectively securable to an outer surface of the first elongated portion along an axial length of the first elongated portion; and
the collar assembly is configured to be securely locked to the first elongated portion at a desired position on the first elongated portion.

17. The apparatus of claim 16, wherein:
the engagement device includes:
a first mating portion provided by the collar assembly; and
a second mating portion provided by the second elongated portion; and
a vertical position and a vertical height of the vehicular handlebar are settable for permitting a user to ride the vehicle by moving the vehicular handlebar until the first mating portion of the collar assembly, in use, contacts the second mating portion of the second elongated portion, so that the second mating portion, in use, engages and interfaces with the first mating portion; and once the first mating portion and the second mating portion are engaged and mated with each other, the first elongated portion and the vehicular handlebar are not able to rotate relative to the second elongated portion, and inadvertent twisting of the vehicular handlebar is prevented once the clamp assembly is activated to clamp the first elongated portion to the second elongated portion, and additional resistance to twisting is provided by the first mating portion and the second mating portion; and the clamp assembly is configured to securely hold and maintain the vehicular handlebar at the vertical position and the vertical height, and the vehicular handlebar is selectively movable, and then rotatable; and the clamp assembly is configured to be selectively deactivated, and the vehicular handlebar and the first elongated portion are movable in unison since the first elongated portion and the vehicular handlebar are affixed to each other, to a different vertical height, and the first mating portion and the second mating portion are selectively disengaged from each other once the first elongated portion is vertically moved, and the first mating portion and the second mating portion are spaced apart from each other along a linear vertical distance; and once the clamp assembly is deactivated, the vehicular handlebar and the first elongated portion are rotatable in unison; and the second mating portion and the first mating portion are rotated away from each other; and once the clamp assembly is selectively activated to lock a position of the first elongated portion and the vehicular handlebar in unison with the second elongated portion, the vehicular handlebar and the first elongated portion, in use, cannot be further rotatable relative to the second elongated portion.

18. The apparatus of claim 1, further comprising:
a collar assembly configured to be movable along the first elongated portion; and
the second elongated portion includes a fork steering tube, in which a front wheel is operatively rotatably mounted to the second elongated portion; and
the first elongated portion defines an elongated channel extending along a length of the first elongated portion; and
the collar assembly includes a collar-engagement device configured to correspond with a profile of the elongated channel of the first elongated portion; and
the collar-engagement device extends radially inward from the collar assembly; and
the engagement device includes:

a second mating portion provided by the second elongated portion; and a first mating portion provided by the collar assembly, and once the second mating portion of the second elongated portion, in use, mates with the first mating portion of the collar assembly, the second elongated portion, in use, cannot twist and cannot be made to rotate along the common axis because the collar-engagement device of the collar assembly is received by, and interfaced with, the elongated channel of the second elongated portion; and the collar assembly includes a collar clamp; and the second elongated portion has an axially-extending expansion slot defined along the second elongated portion, and the axially-extending expansion slot is configured to improve clamping effect and activation of the clamp assembly for selectively affixing the first elongated portion with the second elongated portion; and once the clamp assembly is deactivated, the second elongated portion and the first elongated portion are not affixed to each other, and the first elongated portion is movable relative to the second elongated portion; and once the collar clamp is deactivated, the collar assembly is not affixed to the first elongated portion, and the collar assembly is movable relative to the first elongated portion; and once the collar clamp is activated, the collar assembly is affixed to the first elongated portion, and is not movable relative to the first elongated portion; and once the clamp assembly is activated, the first elongated portion is affixed to the second elongated portion, and the first elongated portion is not movable relative to the second elongated portion.

19. An apparatus, comprising:

a vehicle having a vehicular handlebar, and also having a first elongated portion and a second elongated portion; and the first elongated portion configured to receive and support the vehicular handlebar having a handlebar axis extending therethrough; and the first elongated portion also configured to be slidably received, at least in part, in the second elongated portion; and the second elongated portion configured to receive and support the first elongated portion; and the first elongated portion and the second elongated portion configured to be coaxially aligned along a common axis; and an engagement device configured to selectively engage the first elongated portion and the second elongated portion, of the vehicle, with each other in such a way that the engagement device, in use, prevents the first elongated portion and the second elongated portion from rotating relative to each other along the common axis once the engagement device, in use, selectively engages the first elongated portion and the second elongated portion with each other; and the engagement device also configured to selectively disengage the first elongated portion and the second elongated portion from each other in such a way that the engagement device, in use, permits the first elongated portion and the second elongated portion to rotate relative to each other along the common axis once the engagement device, in use, selectively disengages the first elongated portion and the second elongated portion from each other; and a clamp assembly configured to selectively clamp the first elongated portion and the second elongated portion with each other once the engagement device, in use, selectively engages the first elongated portion and the second elongated portion with each other; and a stem extending radially from the first elongated portion; and the stem having a stem axis extending therethrough; and the stem axis intersecting the common axis; and the stem having:

a first end with a fork clamp configured to clamp the stem to a front fork configured to hold a front wheel of the vehicle; and a second end attached to the second elongated portion, in which the second end of the stem is spaced apart from the first end of the stem; and wherein the fork clamp is positioned on one end of the stem, and the first elongated portion is positioned at another end of the stem; and the fork clamp is configured to be coupled to the front wheel of the vehicle.

* * * * *